(12) United States Patent
Nakamura et al.

(10) Patent No.: US 7,304,836 B2
(45) Date of Patent: Dec. 4, 2007

(54) ELECTRONIC APPARATUS

(75) Inventors: Yasuharu Nakamura, Kawagoe (JP); Takahiro Sasaki, Kawagoe (JP); Akira Shimizu, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 590 days.

(21) Appl. No.: 10/791,558

(22) Filed: Mar. 3, 2004

(65) Prior Publication Data

US 2004/0173714 A1    Sep. 9, 2004

(30) Foreign Application Priority Data

Mar. 5, 2003 (JP) .............................. 2003-059170

(51) Int. Cl.
*G06F 1/16* (2006.01)
(52) U.S. Cl. ..................................... 361/681
(58) Field of Classification Search ................ 361/361, 361/681
See application file for complete search history.

(56) References Cited

U.S. PATENT DOCUMENTS 5,847,685 A    12/1998    Otsuki

FOREIGN PATENT DOCUMENTS

| EP | 1 026 040 A2 | 8/2000 |
|---|---|---|
| EP | 0 995 635 A2 | 4/2004 |
| JP | 10-51712 A | 2/1998 |

OTHER PUBLICATIONS

Chinese Office Action, Application No. 200410007781.

*Primary Examiner*—Yean-Hsi Chang
(74) *Attorney, Agent, or Firm*—Sughrue Mion Pllc.

(57) ABSTRACT

As an electronic apparatus in which a drive power source for generating a drive force to move a movable portion moving freely can be miniaturized, an multi-function electronic apparatus 1 has a main body 2, an operation and display unit 3 as a movable portion, a drive mechanism 4, the first and second pushing units, a guide groove 19 and a slide groove 21. The drive mechanism 4 has a movable arm 15 as a movable portion. The first and second pushing units push the operation and display unit 3 and the movable arm 15. The guide groove 19 and the slide groove 21 change the pushing forces of the first and second pushing units between the first position and the second position.

7 Claims, 14 Drawing Sheets

ELECTRONIC APPARATUS

BACKGROUND OF THE INVENTION

1. Field of the Invention

This invention relates to-an electronic apparatus having a front panel movable against a main body mounted on a car as a vehicle.

2. Description of the Related Art

A car stereo system (refer Patent document 1) as the electronic apparatus is mounted in an instrument panel of a car as a vehicle. The car stereo system has a main body to be mounted in the instrument panel and a front panel including a display such as an LCD display and various operating switches, as a movable portion.

The main body is provided therein with a CD player, an MD player or DVD-ROM player for a navigation system. The front panel is for displaying map information of the navigation system or information to show playback conditions of the CD player or the MD player on the display. The front panel is provided with a touch-type or a push-type switch to be operated for acting various functions of the navigation system, the CD player or the MD player.

The aforesaid car stereo system is provided at a surface of the main body opposite to an operator (call a front surface hereafter) with an insertion opening for inserting a CD, an MD or a DVD-ROM therethrough into the main body to reduce a required area of the instrument panel for mounting the main body. And in the car stereo system, the front panel is slidable between a position to cover the front surface and a position to open at least a part of the front surface.

In the aforesaid car stereo system, a CD, an MD or a DVD-ROM is inserted into and extracted from the main body to position the front panel at the position to open at least a part of the front surface of the main body. After inserting the CD, the MD or the DVD-ROM into the main body, the front panel is moved to the position to cover the front surface, and the touch-type switch or the various push-type switches are operated to drive the CD player, the MD player or the DVD-ROM player. The information to show playback conditions of these players is shown on the LCD display.

In the aforesaid usual car stereo system, the front panel is movable slidably between a position to cover the front surface and a position to open at least a part of the front surface. In the usual car stereo system, the front panel or a moving member interlockingly with the front panel is pushed by a constant pushing force of a cushion formed with rubber or a coil spring between a position to cover the front surface and a position to open at least a part of the front surface. Thereby, the front panel of the usual car stereo system is prevented from vibrating caused by vibration of the car in driving so as to prevent from a noise by vibration of the front panel.

The patent reference 1 is Japan Patent Application Laid-open W10-51712.

3. Objects to be Solved

In the usual car stereo system, the front panel or a moving member interlockingly with the front panel is pushed by a constant pushing force of a cushion formed with rubber or a coil spring over an area between the position to cover the front surface and the position to open at least a part of the front surface. A required drive force of a drive power source like a motor for moving the front panel may be apt to be increased. In a car stereo system specified by that a bottom end portion of the front panel is projected from the main body and a top end portion of the front panel is moved along the front surface of the main body, the largest drive force is required for starting the front panel to move from the position to open at least a part of the front surface toward the position to cover the front surface.

Therefore, in the usual car stereo system, a drive power source like a motor may be enlarged and the cost may be increased. Thereby, the other electronic parts mounted in the electronic apparatus like the aforesaid car stereo system may be limited in size and the cost of the electronic apparatus may be increased.

To overcome the above drawback, one object of this invention is to provide an electronic apparatus which a drive power source for generating a drive force to move a movable portion to move freely against the main body can be miniaturized and the cost can be reduced.

SUMMARY OF THE INVENTION

How to Attain the Object

In order to attain the objects, an electronic apparatus according to this invention is specified, in an electronic apparatus having a movable portion to be moved by a driving force of a drive power source between a first position and a second position against a main body, by that the electronic apparatus includes pushing device for pushing the movable portion over an area between the first position and the second position, and changing device for changing an pushing force of the pushing device to push the movable portion between the first position and the second position.

In the electronic apparatus according to this invention, the changing device changes the pushing force of the pushing device to push the movable portion between the first position and the second position. Thereby, the pushing force can be reduced when a load on the drive power source is large.

If a load on the drive power source of the electronic apparatus according to this invention is larger when the movable portion is positioned between a center of the first and second positions and the first position, the changing device may preferably make the first pushing force of the pushing device smaller than the second pushing force of the pushing device on positioning the movable portion between a center of the first and second positions and the second position. The changing device may preferably have a first zone in which the pushing device pushes the movable portion with the first pushing force when the movable portion is positioned between a center of the first and second positions and the first position, a second zone in which the pushing device pushes the movable portion with the second pushing force when the movable portion is positioned between a center of the first and second positions and the second position, and a transition zone, being disposed between the first zone and the second zone, in which the pushing force of the pushing device is changed between the first pushing force and the second pushing force.

The changing device may preferably change the pushing force of the pushing device gradually from the first pushing force to the second pushing force. The changing device may preferably change the pushing force of the pushing device pushes stepwise from the first pushing force to the second pushing force.

The changing device may be disposed in one of the movable portion and the main body, and the pushing device may be disposed in the other of the movable portion and the main body. The changing device may have an pushed member to contact with the changing device and an pushing member to push the pushed member toward the changing device. The movable portion may be preferably a front panel or a movable arm.

The pushing device may have a first pushing device including a roller mounted at the front panel and a first pushing member for pushing the roller. The changing device is received the roller to penetrate therein, and a depth of a portion which the roller at the first position penetrates into and a depth of a portion which the roller at the second position penetrates into may be different.

The pushing device may have a second pushing device, the second pushing device including a rotating member mounted rotatably at the main body and a second pushing member for pushing the rotating member toward the movable arm. The changing device may be contacted with the rotating member, and a height of a portion at which the rotating member at the first position contacts and a height of a portion at which the rotating member at the second portion contacts may be different.

The above and other objects and features of this invention will become more apparent from the following description taken in conjunction with the accompanying drawings.

DESCRIPTION OF THE PREFERRED EMBODIMENT

Figure 1:
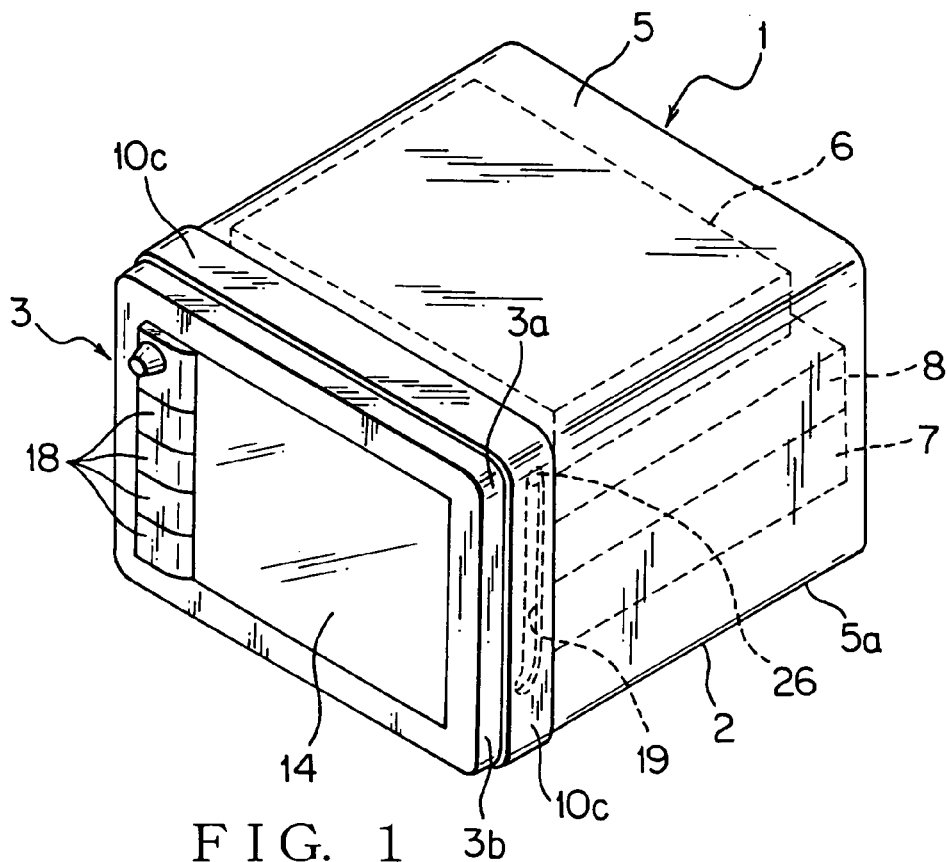
FIG. 1 is a perspective view of an external appearance of an embodiment of a multi-function electronic apparatus according to this invention.

A multi-function electronic apparatus 1 as a first embodiment of an electronic apparatus according to this invention is described with reference to FIG. 1-13. The multi-function electronic apparatus 1 shown in FIG. 1 is mounted in an instrument panel of a car as a vehicle. The multi-function electronic apparatus 1 has a main body 2, an operation and display unit 3 as a front panel and a drive mechanism 4 (shown in FIG. 4-6) for moving slidingly the operation and display unit 3 against a later-described front surface 10a, as shown in FIG. 1-3.

Figure 2:
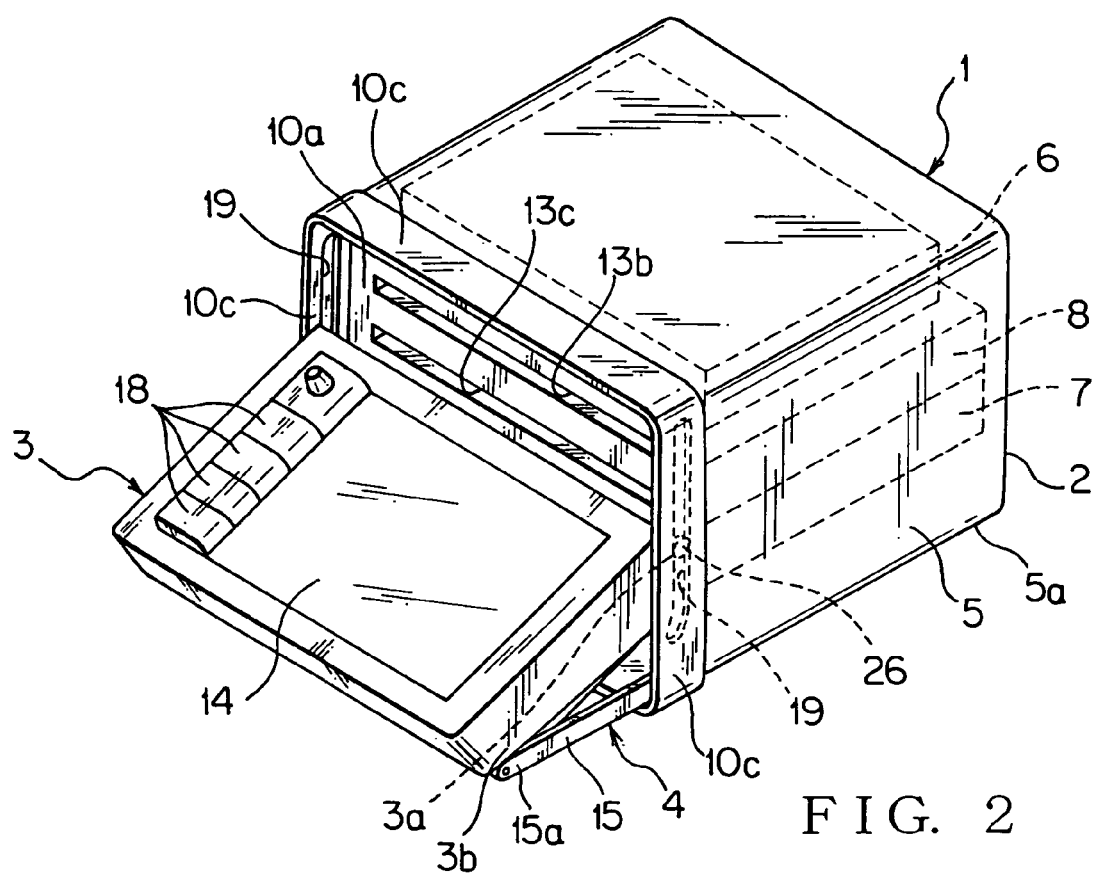
FIG. 2 is a perspective view of the multi-function electronic apparatus according to FIG. 1, in which an operation and display unit is positioned at the third position.
Figure 3:
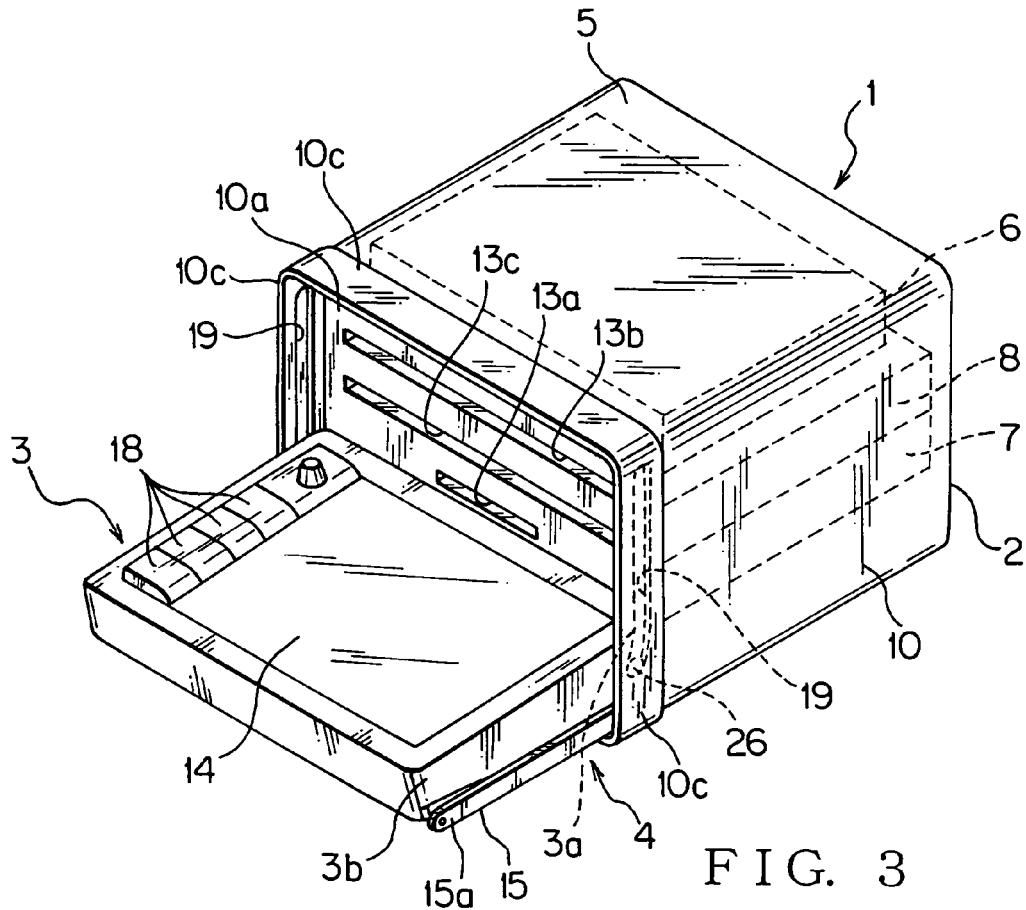
FIG. 3, is a perspective view of the multi-function electronic apparatus according to FIG. 1, in which the operation and display unit is positioned at the first position.

The main body 2 includes a case 5 formed box-like, a chassis 10 (shown in FIG. 4-6) to be received in the case 5, the front surface 10a as one surface at a front of the case 5 shown near side in FIG. 2, and a playback devise like a CD player 6 to be received in the case 5. The case 5 has a plurality of vertical walls 10c formed integrally as standing from all edges of the front surface 10a. A space formed by the plurality of vertical walls 10c receives the operation and display unit 3 to rotate freely therein.

The chassis 10 is made of sheet metal. The chassis 10 has a plate-like bottom chassis 11 and side chassises 12 standing from both edges of widthwise of the bottom chassis 11. The bottom chassis 11 is disposed above a bottom wall 5a (shown in FIG. 1-3) of the case 5 of the main body 2.

According to the embodiment, a CD player 6, an MD player 7 and a DVD-ROM player 8 for a navigation system as playback devices are received in the case 5. A not-shown FM/AM tuner for receiving radio transmission and a not-shown TV tuner for receiving TV transmission are received in the case 5. The playback devices and tuners are operated by pushing later-described push button 18 disposed in the operation and display unit 3.

The front surface 10a is provided with a slit 13a for inserting an MD into the MD player 7 and insertion openings 13b, 13c for inserting a CD and a DVD-ROM into the CD player 6 and the DVD-ROM player 8.

The operation and display unit 3 has a display panel 14 including an LCD display (Liquid Crystal Display) for displaying image information. In the operation and display unit 3, map information replayed by the DVD-ROM player 8 and images by TV transmission received by the TV tuner are displayed in the display panel 14.

A top end portion 3a as one end portion of the operation and display unit 3 is mounted on the case 5, i.e. the main body 2, so as to slide freely along the front surface 10a. A bottom end portion 3b as the other end portion thereof is provided so as to freely project from the front surface 10a and return thereto.

The operation and display unit 3 has a plurality of push buttons 18 on a surface thereof. The push button 18 is pushed by an operator for operation. The respective players 6, 7, 8 received in the case 5 are driven by operating the push buttons 18.

The operation and display unit 3 is moved between a first position shown in FIG. 3 and a second position shown in FIG. 1 through a third position shown in FIG. 2 between the first position and the second position by operating the push button 18. The roller 26 is moved in a later-described guide groove 19 by action of the drive mechanism 4 so that the operation and display unit 3 can be moved between the first position and the second position.

The operation and display unit 3 is moved from the first position through the third position to the second position in order. The operation and display unit 3 is also moved from the second position through the third position to the first position in order. At that time, the bottom end portion 3b of the operation and display unit 3 is projecting from the front surface 10a and the top end portion 3a of the operation and display unit 3 is sliding along the front surface 10a.

All of the slit 13a and insertion openings 13b, 13c disposed at the front surface 10a are opened as shown in FIG. 3 when the operation and display unit 3 is at the first position. The operation and display unit 3 at the first position opens the front surface 10a. The operation and display unit 3 at the third position opens the insertion openings 13b, 13c and covers the slit 13a.

The operation and display unit 3 at the third position covers a part of the front surface 10a. The operation and display unit 3 at the second position covers the slit 3a and the insertion openings 13b, 13c as shown in FIG. 1. The operation and display unit 3 at the second position covers all over the front surface 10a.

When a select button (for selecting CD or MS) or an OPEN button of the push buttons 18 is pushed, the operation and display unit 3 is moved slidingly by the drive mechanism 4. In other words, when CD is selected with the select button, the operation and display unit 3 is moved slidingly to the third position by the drive mechanism 4.

When the OPEN button is pushed, the operation and display unit 3 is moved slidingly to the first position in which all of insertion openings (slit 13a, the insertion openings 13b and 13c) disposed at the front surface 10a of the chassis 10 are opened. After a required disk like the CD or the MD is inserted or ejected through the slit 13a or the insertion openings 10b, 10c, the operation and display unit 3 is moved automatically by the drive mechanism 4 to the second position (position of covering all of the slit 13a, the insertion openings 13b and 13c) in which the operation and display unit 3 covers the front surface 10a of the chassis 10.

After the required disk is inserted at the first position or the third position in which the front surface 10a of the chassis 10 is opened, the operation and display unit 3 is moved automatically to the second position in which the front surface 10a is covered. Thereafter, when a PLAY button or SEARCH button of push buttons 18 is operated, playing the disk or search operation is performed.

Slide motion of the operation and display unit 3 is performed by that a not-shown micro-computer controls a rotating direction and rotating speed of a later-described motor 16 of the drive mechanism 4. The micro-computer recognizes inserting the disk and operating the push button 18 and controls the rotating direction and the rotating speed of the motor 16 so as to move slidingly and position the operation and display unit 3 at a position corresponding to operations.

Figure 4:
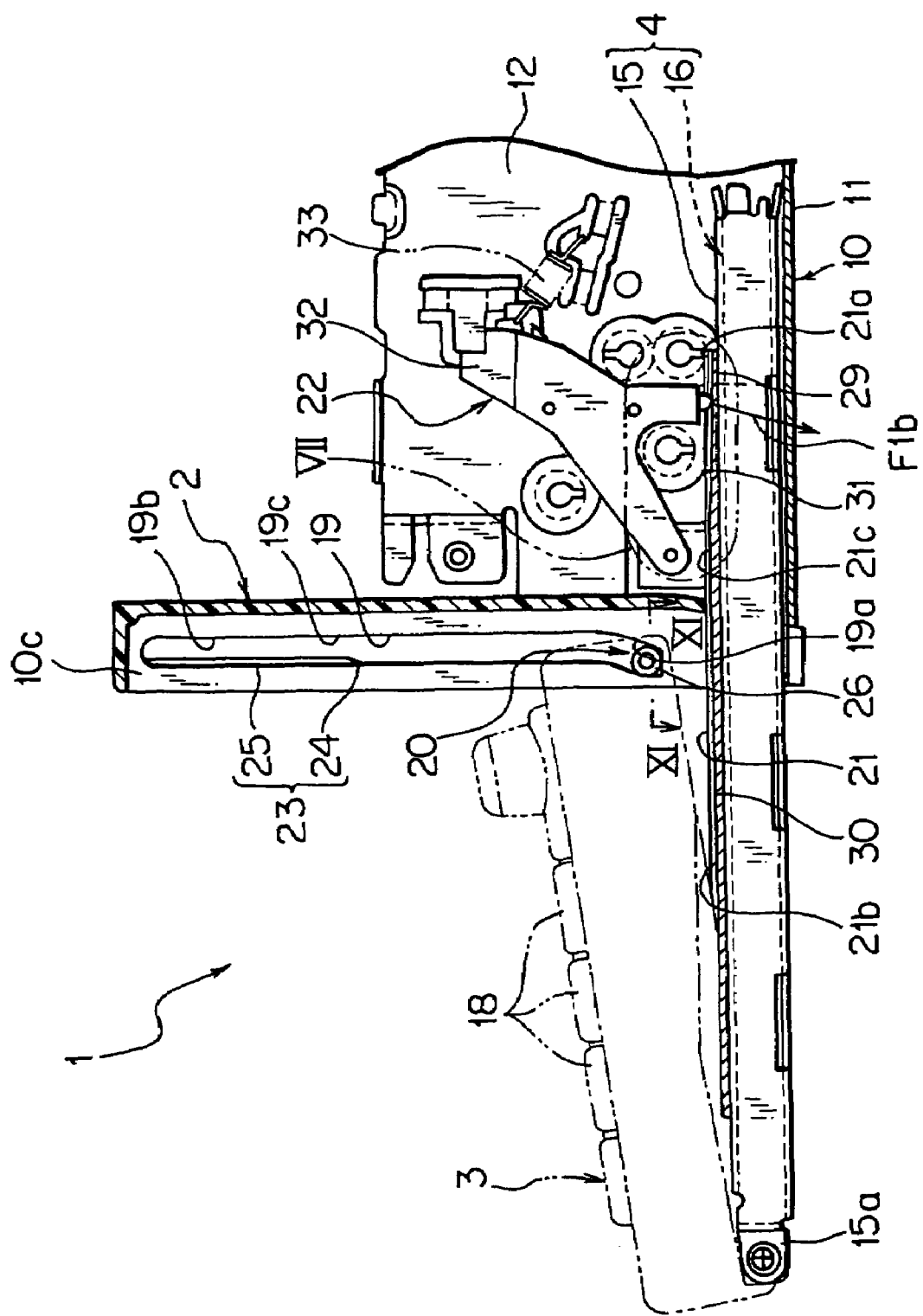
FIG. 4 is a side view of a main part of the multi-function electronic apparatus according to FIG. 3.
Figure 5:
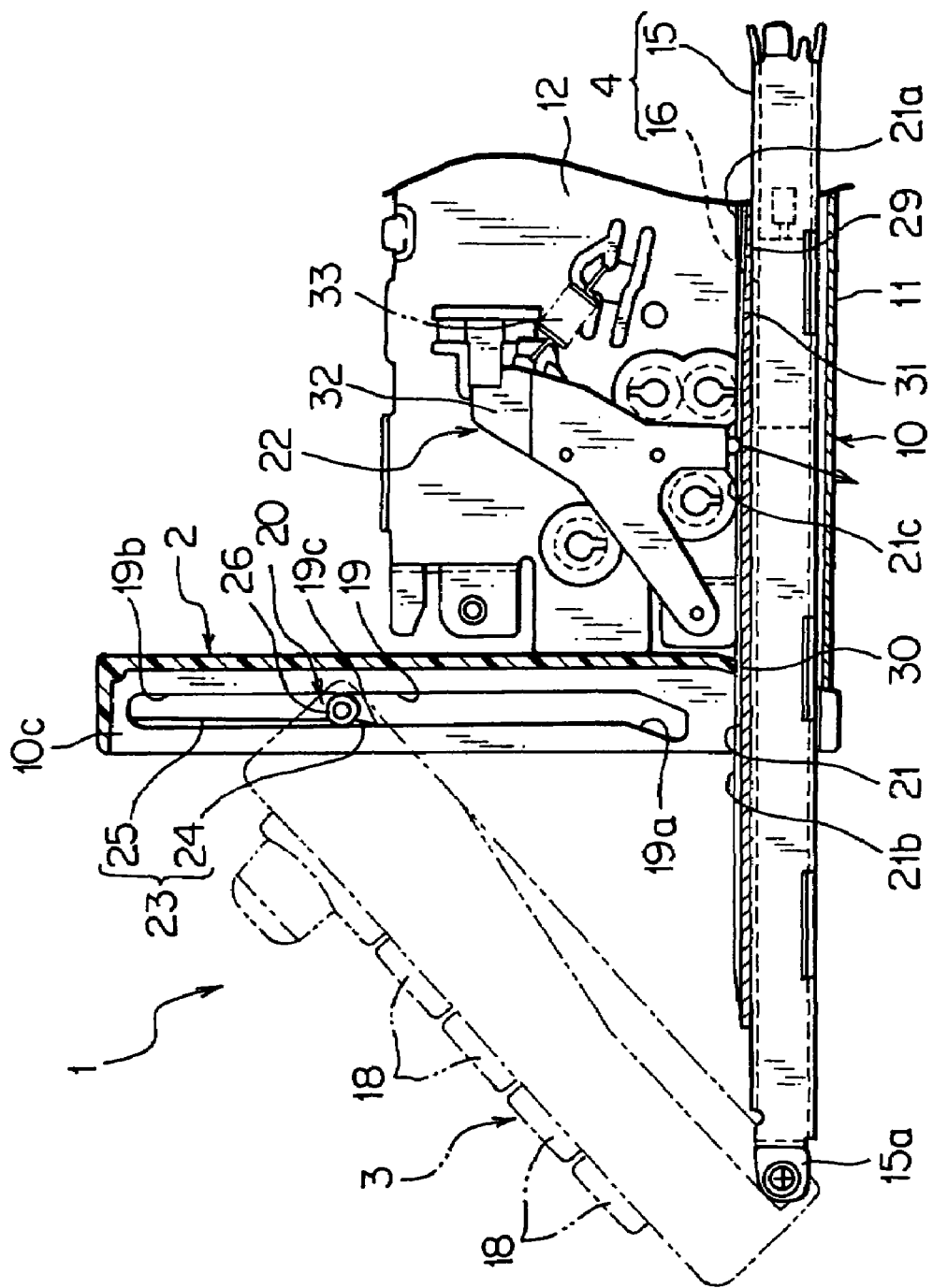
FIG. 5 is a side view of a main part of the multi-function electronic apparatus according to FIG. 2.
Figure 6:
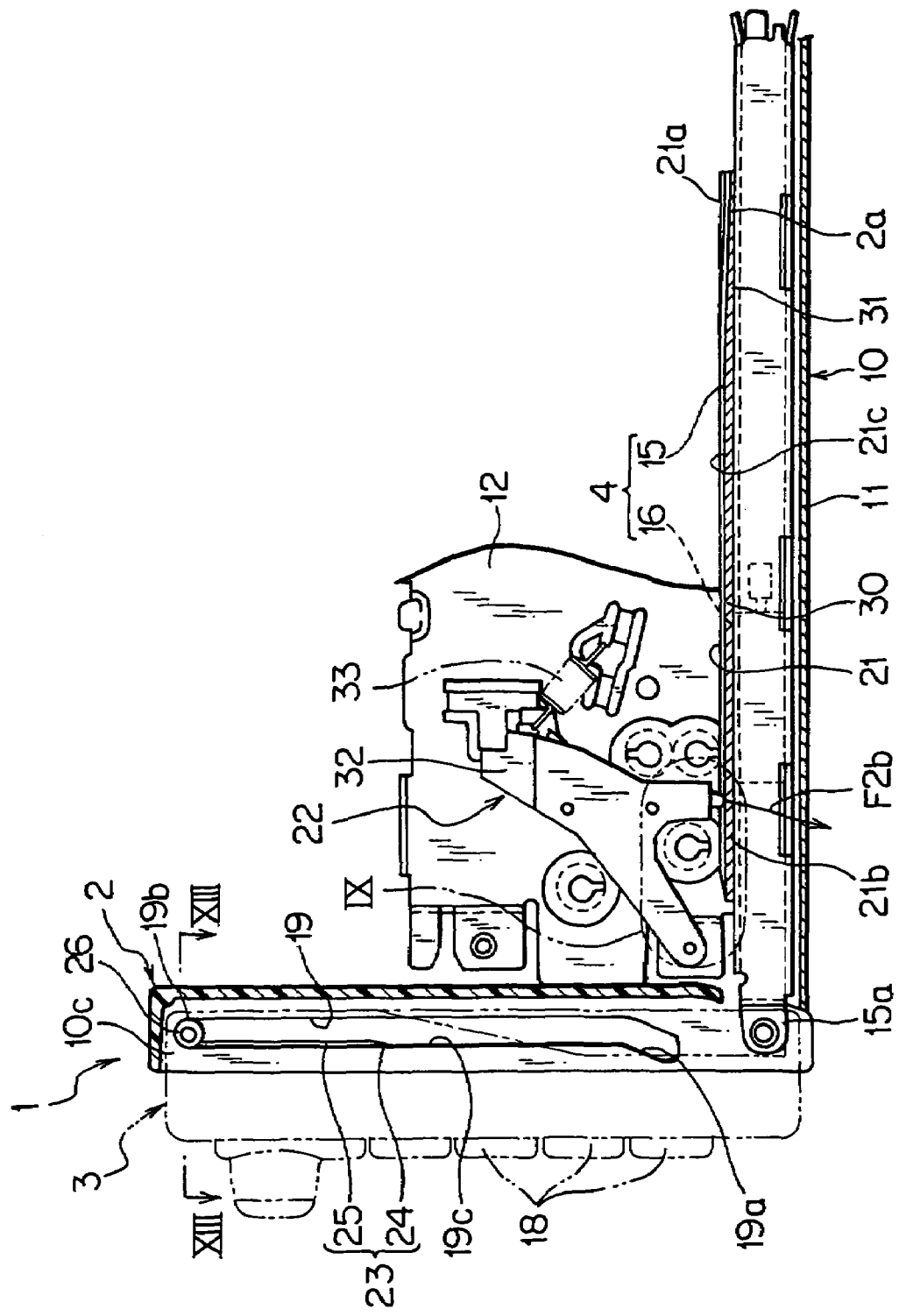
FIG. 6 is a side view of a main part of the multi-function electronic apparatus according to FIG. 1.

The drive mechanism 4 has a movable arm 15 and the motor 16 as the drive power source, as shown in FIG. 4-6. The movable arm 15 is formed into band-shape extending in one direction. The movable arm 15 is supported by the chassis 10 so as to cross the lengthwise of the movable arm 15 with the front surface 10a. The movable arm 15 is supported slidably along the lengthwise thereof by the chassis 10. Then, the movable arm 15 is disposed slidably along a direction perpendicular to the front surface 10a. One end portion 15a, closer to the operation and display unit 3, of the movable arm 15 projects from the front surface 10a by sliding.

Two movable arms 15 are disposed along inner walls of both side chassises 12 of the chassis 10. Each movable arm 15 is provided at one end portion 15a with a hole. A pin disposed on each side wall of the bottom end portion 3b of the operation and display unit 3 is fitted rotatably with the hole. Thereby, the movable arms 15 support rotatably the bottom end portions 3b of the operation and display unit 3, and move together with the operation and display unit 3.

The motor 16 moves the respective movable arms 15 slidingly against the chassis 10 along lengthwise of the movable arms 15. In other words, the respective movable arms 15 are moved inwardly and outwardly against the chassis 10 through not-shown through holes disposed at bottom area of the front surface 10a.

In the drive mechanism 4 having above structure, respective movable arms 15 are moved inwardly and outwardly against the chassis 10 by drive force of the motor 16. Thereby, later-described rollers 26 provided at the operation and display unit 3 slide along the guide grooves 19.

When respective movable arms 15 are moved outwardly against the chassis 10 by drive force of the motor 16, the operation and display unit 3 is positioned to make a surface thereof face upward. Thus, the operation and display unit 3 is moved to the third position or the first position to open the front surface 10a of the chassis 10. When respective movable arms 15 are moved inwardly against the chassis 10, the operation and display unit 3 laid down is moved to the second position to cover the front surface 10a of the chassis 10, and the rollers 26 are positioned at top end portions 19b of the guide grooves 19.

When the operation and display unit 3 positioned at the first position and the movable arms 15 are moved toward the second position, a load of the motor 16 reaches the maximum value. The load of the motor 16 on positioning the operation and display unit 3 and the movable arms 15 close to the first position is higher than the load of the motor 16 on positioning the operation and display unit 3 and the movable arms 15 close to the second position.

The operation and display unit 3 and the movable arms 15 are moved between the first position and the second position against the main body 2 by drive force of the motor 16. The operation and display unit 3 and the movable arms 15 correspond to the movable portion described in this specification.

The multi-function electronic apparatus 1 has the guide grooves 19 as changing device, a first pushing unit 20 as the first pushing device, a slide groove 21 as changing device and a second pushing unit 22 as the second pushing device.

The guide grooves 19 are disposed on inner surfaces of the vertical walls 10c facing to the both sides of the operation and display unit 3 received in the aforesaid space at the second position. In other words, the guide grooves 19 are provided in the main body 2.

The guide grooves 19 extend vertically so as to be formed dent from the inner surfaces of the vertical walls 10c. The later-described rollers 26 provided at the both sides of the top end portion 3a of the operation and display unit 3 are engaged slidably with the guide grooves 19. Thus, the rollers 26 penetrate into the guide grooves 19. The guide rollers 26 are located in a bottom end portion (one end portion) 19a at the aforesaid first position as shown in FIG. 4. The guide rollers 26 are located in a top end portion (the other end portion) 19b at the second position as shown in FIG. 6. The guide rollers 26 are located in a central portion 19c at the third position as shown in FIG. 5.

Figure 10A:
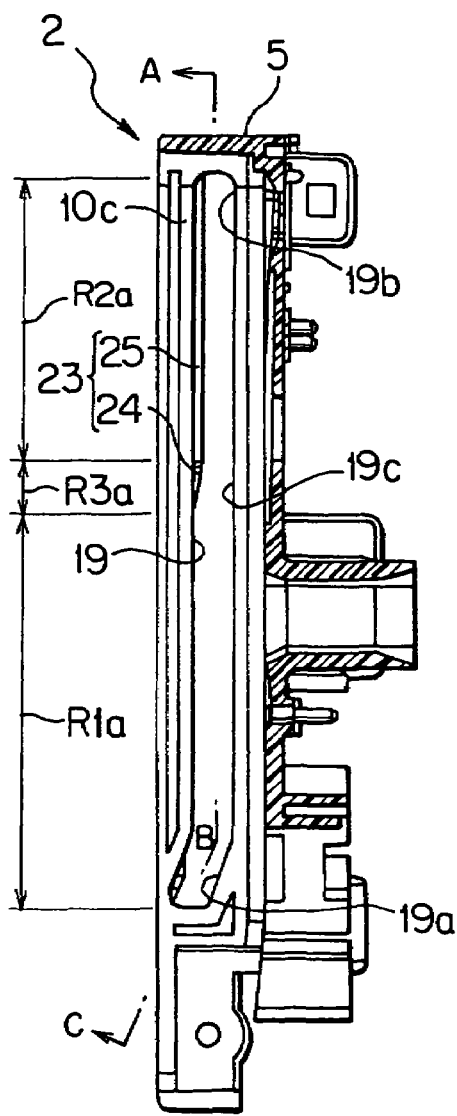
FIG. 10A is a partially sectional inside view of a vertical wall of the multi-function electronic apparatus in FIG. 1.
Figure 10B:
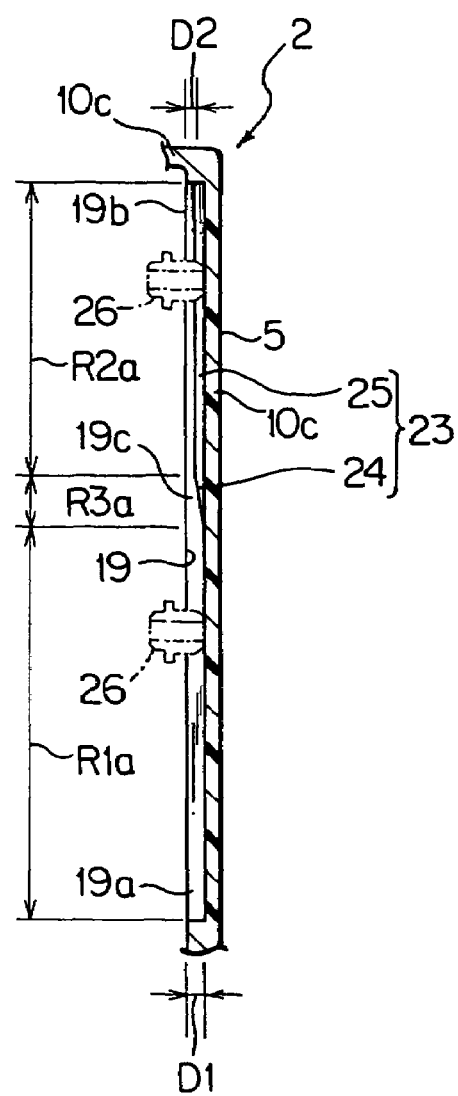
FIG. 10B is a sectional view taken along the A-B-C line in FIG. 10A.

A projection 23 is provided in the guide groove 19 as shown in FIGS. 10A, 10B. The projection 23 is disposed between the central portion 19c and the top end portion 19b to extend vertically. The projection 23 is formed between a bottom surface of the guide groove 19 and one inner surface continued to the bottom surface as projecting from the both surfaces.

The projection 23 has a slant portion 24 and a flat portion 25. The slant portion is provided at the central portion 19c of the guide groove 19. A projecting height of the slant portion 24 from the inner surface of the guide groove 19 is gradually increasing from the bottom end portion 19a toward the top end portion 19b of the guide groove 19.

The flat portion 25 continued to the slant portion 24 is provided between the slant portion 24 and the top end portion 19b. A projecting height of the flat portion 25 from the inner surface is constant along a lengthwise of the guide groove 19. A later-described chamfer 28 of the roller 26 penetrating in the guide groove 19 abuts on the slant portion 24 and the flat portion 25, i.e. the projection 23. When the movable arm 15 moves a predetermined distance A (shown in FIGS. 7, 8) while the operation and display unit 3 is moved from the first position to the second position, the chamfer 28 of the roller 26 starts to contact with the slant portion 24. When the operation and display unit 3 is positioned at the third position, the chamfer 28 of the roller 26 abuts on the flat portion 25.

By making the chamfer 28 abut on the projection 23, the roller 26 pushed by a later-described a coil spring 27 is displaced toward the operation and display unit 3 against the pushing force of the coil spring 27. In other words, when the roller 26 abuts on the projection 23, the coil spring 27 is compressed: Thereby, the pushing force that the coil spring 27 pushes the roller 26 and the projection 23, i.e. the operation and display unit 3 is increasing.

A second zone R2a in which the flat portion 25 of the guide groove 19 is provided (shown in FIGS. 10A, 10B) corresponds to the second zone described in this specification. A transition zone R3a in which the slant portion 24 of the guide groove 19 is provided (shown in FIGS. 10A, 10B) corresponds to the transition zone described in this specification. The transition zone R3a is disposed between the later-described first zone R1a and the second zone R2a. The first zone R1a in which the projection 23 of the guide groove 19 is not provided (shown in FIGS. 10A, 10B) corresponds to the first zone described in this specification. Thus, the guide groove 19 has the zones R1a, R2a, R3a.

A depth D2 of the guide groove 19 at the second zone R2a having the aforesaid projection 23 is smaller than a depth D1 of the guide groove 19 at the first zone R1a, as shown FIG. 10B. In other words, the depth D1 of the guide groove 19 at the first zone R1a in which the roller 26 penetrates when the operation and display unit 3 is positioned close to the first position and the depth D2 of the guide groove 19 at the second zone R2a in which the roller 26 penetrates when the operation and display unit 3 is positioned close to the first position are different. The first zone R1a corresponds to the first portion described in this specification and the second zone R2a corresponds to the second portion described in this specification.

Figure 11:
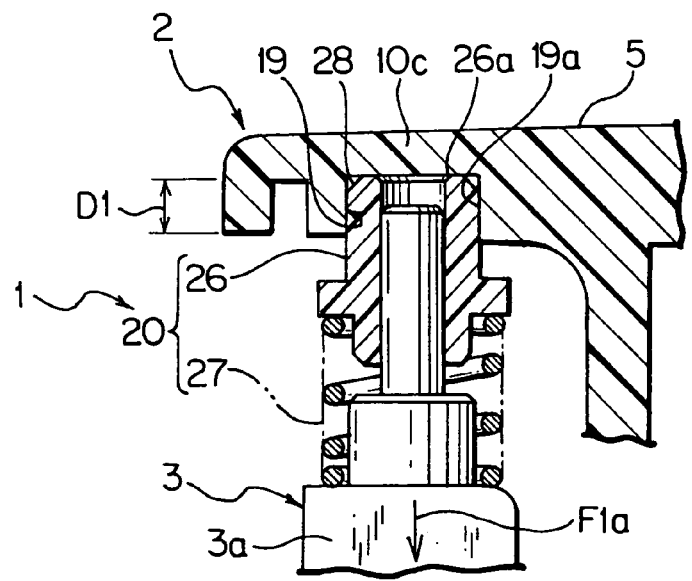
FIG. 11 is a sectional view taken along the XI-XI line in FIG. 4.
Figure 12:
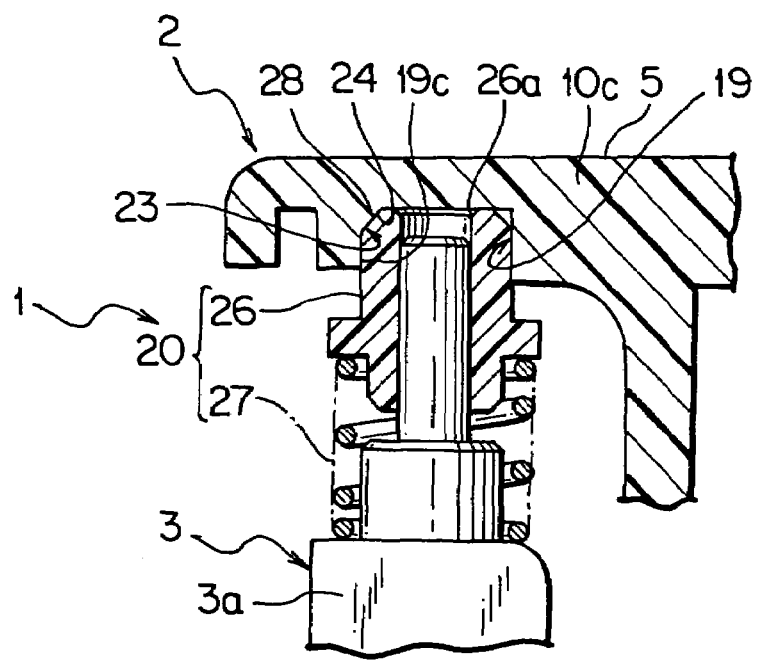
FIG. 12 is a partially sectional view, showing the roller positioned on the slant portion in the multi-function electronic apparatus in FIG. 11.
Figure 13:
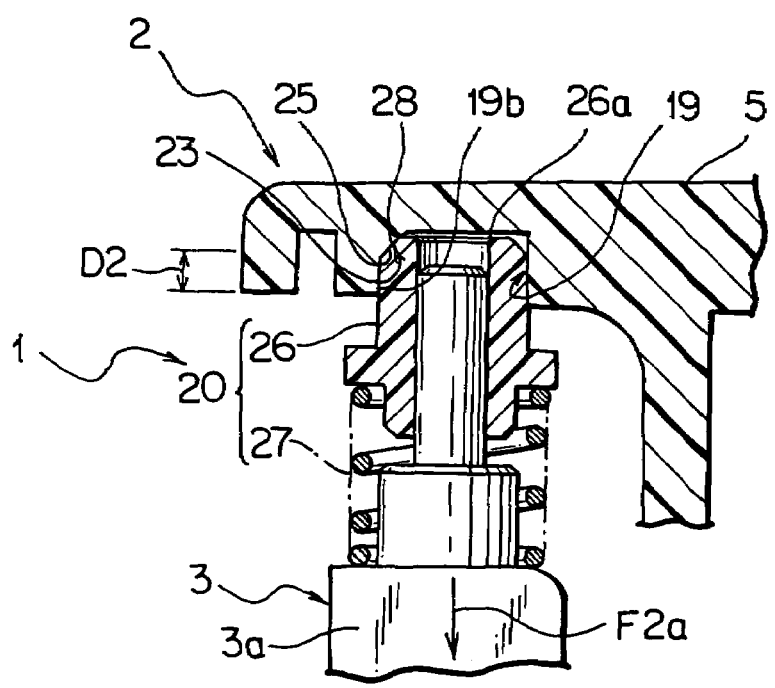
FIG. 13 is a sectional view taken along the XIII-XIII line in FIG. 6.

A first pushing unit 20 is mounted on the operation and display unit 3. The first pushing unit 20 includes the roller 26 as a pushed member and the coil spring 27 as a pushing member as shown in FIG. 11-13. The rollers 26 formed into cylindrical shape are mounted rotatably around shafts on the both side surfaces of the top end portion 3a of the operation and display unit 3. The roller 26 projects from the side surface of the operation and display unit 3. The roller 26 is supported to project freely from the top end portion 3a of the operation and display unit 3 and return thereto.

The roller 26 is engaged rotatably around the shaft with the aforesaid guide groove 19 so as to move freely along the guide groove 19. The roller 26 contacts with the guide groove 19. The roller 26 has the chamfer 28 around at an outer edge thereof as shown in FIG. 11-13. While the movable arm 15 moves the predetermined distance A from the first position, an end surface 26a of the roller 26 contacts with the bottom surface of the guide groove 19. While the movable arm 15 moves to the second position over the predetermined distance A, the chamfer 28 contacts with the projection 23 of the guide groove 19.

The coil spring 27 is disposed between the operation and display unit 3 and the roller 26 so as to push the roller 26 in a direction of projecting from the operation and display unit 3. The coil spring 27 pushes the roller 26 toward the guide groove 19. Thus, the first pushing unit 20 pushes the operation and display unit 3 over an area between the first position and the second position with a reaction force generated by pushing the roller 26 toward the guide groove 19, i.e. the main body 2. The coil spring 27 corresponds to the first pushing member described in this specification.

According to the guide groove 19 and the first pushing unit 20 structured above, the roller 26 is positioned in the first zone R1a when the operation and display unit 3 is positioned close to the first position. The end surface 26a of the roller 26 abuts on the bottom surface of the guide groove 19 so that the first pushing unit 20 pushes the guide groove 19, i.e. the operation and display unit 3, with a first pushing force F1a (shown in FIG. 11). Thereby, in the first zone R1a, the operation and display unit 3 is positioned close to the first position and the first pushing unit 20 pushes the operation and display unit 3 with the first pushing force F1a.

When the operation and display unit 3 is positioned close to the second position, the roller 26 is positioned in the second zone R2a. The chamfer 28 of the roller 26 abuts on the flat portion 25 of the projection 23 in the guide groove 19 and thereby, the coil spring 27 is compressed. The first pushing unit 20 pushes the guide groove 19, i.e. the operation and display unit 3, with the second pushing force F2a (shown in FIG. 13). Thereby, in the second zone R2a, the operation and display unit 3 is positioned close to the second position and the first pushing unit 20 pushes the operation and display unit 3 with the second pushing force F2a.

The coil spring 27 is more compressed at the second position than at the first position so that the first pushing force F1a is smaller than the second pushing force F2a.

According as the operation and display unit 3 is moving from the first position toward the second position, the chamfer 28 of the roller 26 abuts on the slant portion 24 of the projection 23 so that the coil spring 27 is gradually compressed. The roller 26 is positioned in the transition zone R3a. Thus, the pushing force of the first pushing unit 20 is gradually changed from the first pushing force F1a to the second pushing force F2a.

According as the operation and display unit 3 is moving from the second position toward the first position, the chamfer 28 of the roller 26 contacts in order with the flat portion 25 and the slant portion 24 of the projection 23. Thereby, the coil spring 27 is gradually returned. The roller 26 is positioned in the transition zone R3a. Thus, the pushing force of the first pushing unit 20 is gradually changed from the second pushing force F2a to the first pushing force F1a.

As mentioned above, the guide groove 19 changes the pushing force of the first pushing unit 20 between the first position and the second position. The guide groove 19 makes the first pushing force F1a of the first pushing unit 20, when the operation and display unit 3 is positioned close to the first position, smaller than the second pushing force F2a of the first pushing unit 20, when the operation and display unit 3 is positioned close to the second position.

When the operation and display unit 3 moves from the first position toward the second position, the pushing force of the first pushing unit 20 is changed gradually from the first pushing force F1a to the second pushing force F2a in the transition zone R3a. When the operation and display unit 3 moves from the second position toward the first position, the pushing force of the first pushing unit 20 is changed gradually from the second pushing force F2a to the first pushing force F1a in the transition zone R3a. The first pushing unit 20 corresponds to the pushing device described in this specification.

A slide groove 21 is provided on one surface (call a top surface hereafter) of the movable arm 15 located upside in FIG. 4-6. The slide groove 21 is provided at the movable arm 15 as the movable portion. A later-described rotating member 32 penetrates into the slide groove 21.

The slide groove 21 is formed hollow from the top surface of the movable arm 15 to extend in a direction of lengthwise of the movable arm 15, i.e. in a moving direction of the movable arm 15. When the operation and display unit 3 is positioned at the first position, the rotating member 32 is positioned in a rear end portion (one end portion) 21a at right end of the slide groove 21, far from the operation and display unit 3 in FIG. 4. When the operation and display unit 3 is positioned at the second position, the rotating member 32 is positioned in a front end portion (the other end portion) 21b at left end of the slide groove 21, close to the operation and display unit 3 in FIG. 6. When the operation and display unit 3 is positioned at the third position, the rotating member 32 is positioned in a middle portion 21c of the slide groove 21 in FIG. 5.

Figure 7:
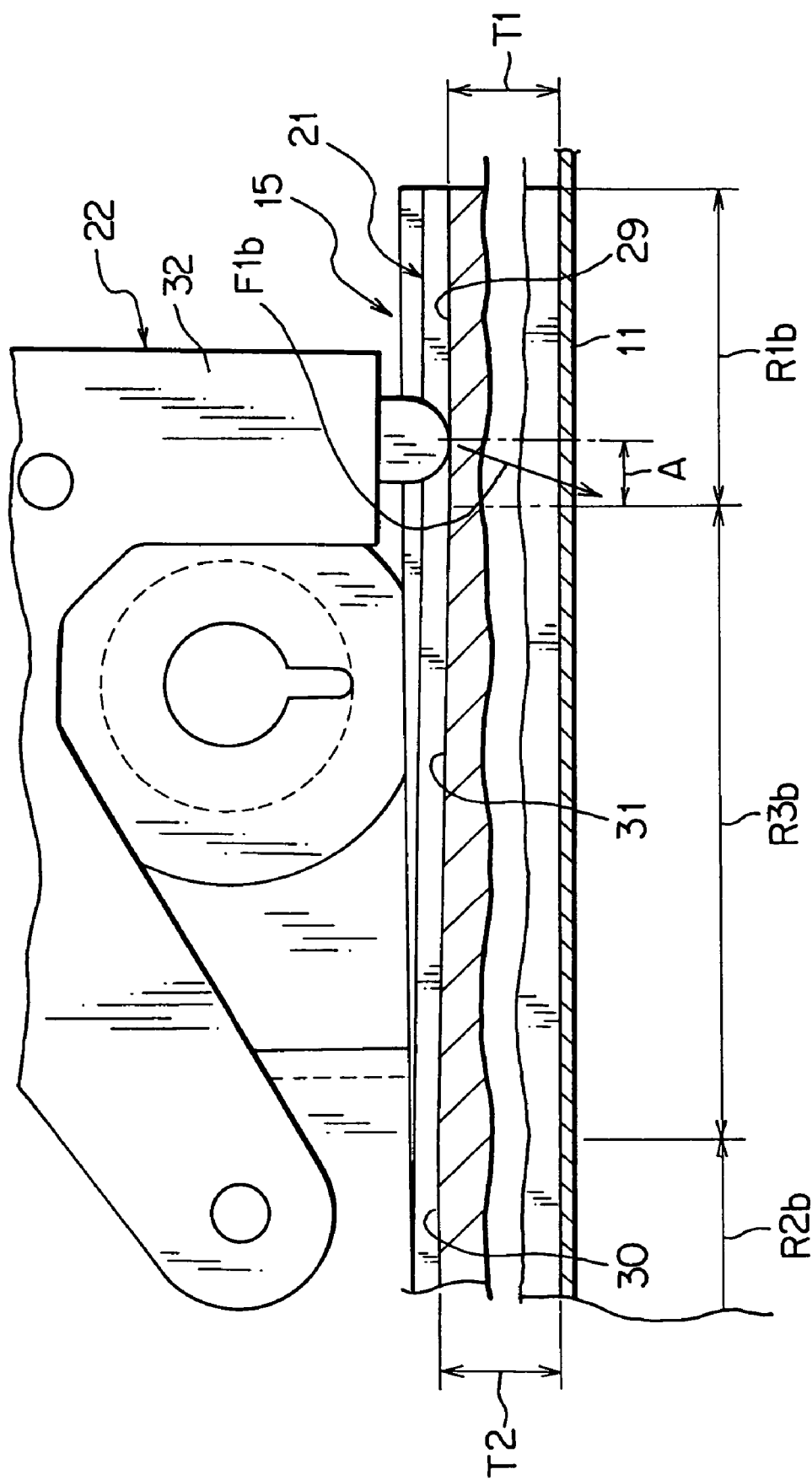
FIG. 7 is a partially sectional expanded view of the VII area of the multi-function electronic apparatus in FIG. 4.
Figure 8:
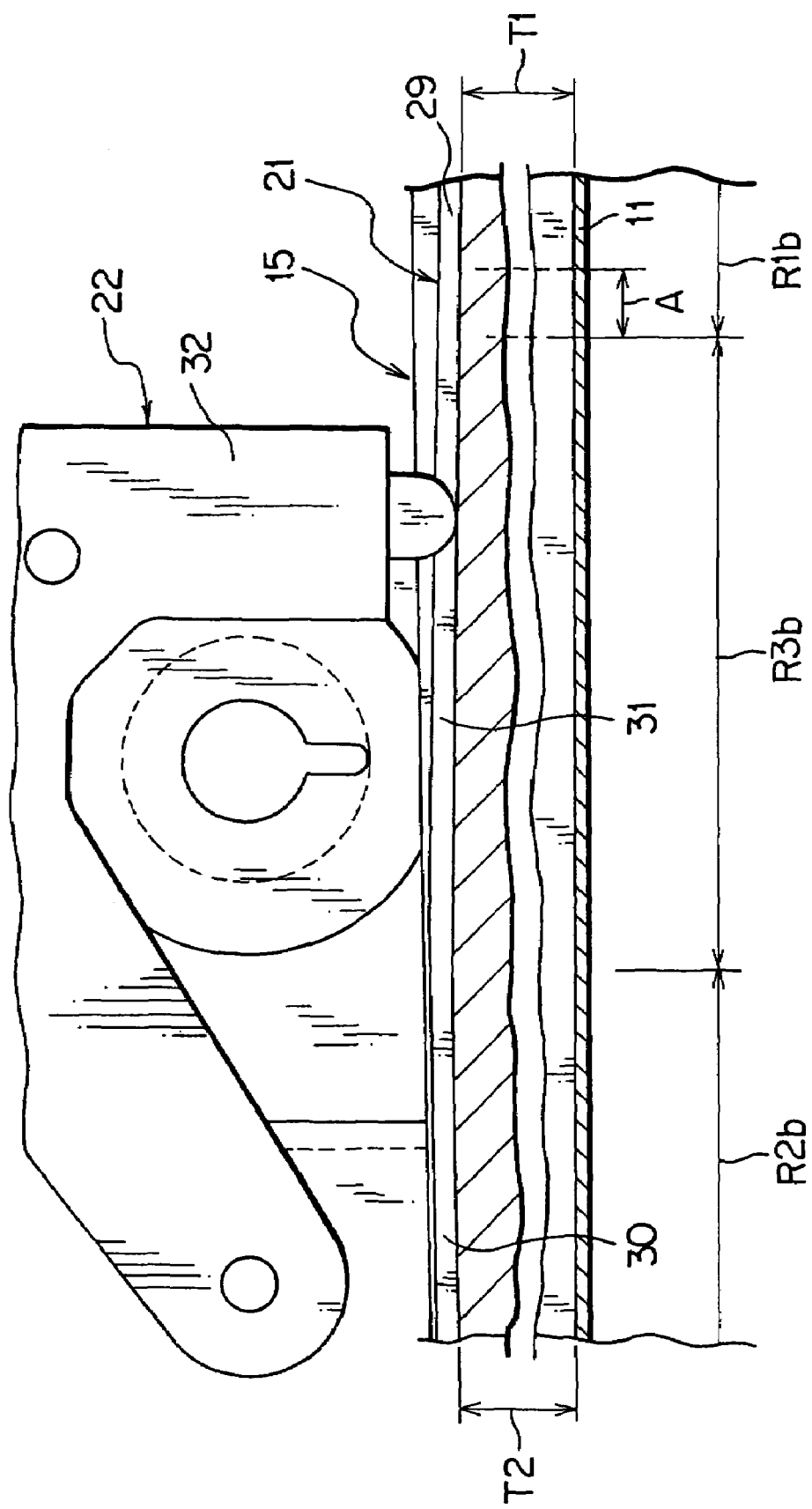
FIG. 8 is a partially sectional expanded view, showing the other end portion of the rotating member positioned on the slant portion in the multi-function electronic apparatus in FIG. 7.

The slide groove 21 has a first flat portion 29 (shown in FIGS. 7, 8), a second flat portion 30 (shown in FIGS. 8, 9) and a slant portion 31 (shown in FIGS. 7, 8). The first flat portion 29 is disposed at the rear end portion (the one end portion) of the movable arm 15. The second flat portion 30 is disposed at the front end portion (the other end portion) 15a of the movable arm 15. A height T2 of the second flat portion 30 from the bottom chassis 11 of the chassis 10 is higher than a height T1 of the first flat portion 29 from the bottom chassis 11. The slant portion 31 is disposed between the first flat portion 29 and the second flat portion 30 to connect the first and second flat portions 29, 30. Height of the slant portion 31 from the bottom chassis 11 of the chassis 10 is gradually increased from the first flat portion 29 to the second flat portion 30.

The rotating member 32 contacts with the slide groove 21. While the movable arm 15 moves the predetermined distance A from the first position, the rotating member 32 contacts with the first flat portion 29. When the movable arm 15 moves over the predetermined distance A while the operation and display unit 3 moves from the first position toward the second position, the rotating member 32 starts to contact with the slant portion 31. When the movable arm 15 is positioned at the third position, the rotating member 32 contacts with the second flat portion 30.

When the rotating member 32 contacts with the slant portion 31 and the second flat portion 30, the rotating member 32 pulled by a later-described coil spring 33 moves upward against a pulling force of the coil spring 33. Thereby, when the rotating member 32 contacts with the slant portion 31 and the second flat portion 30, the coil spring 33 is extended. Therefore, the pulling force of coil spring 33 for pulling the rotating member 33, i.e. a force for pushing the movable arm 15, is increased.

The first zone R1b of the slide groove 21 (shown in FIGS. 7, 8) where the first flat portion 29 is disposed corresponds to the first zone described in this specification. The second zone R2b of the slide groove 21 (shown in FIG. 7-9) where the second flat portion 30 is disposed corresponds to the second zone described in this specification. The transition zone R3b of the slide groove 21 (shown in FIGS. 7, 8) where the slant portion 31 is disposed corresponds to the transition zone described in this specification. The transition zone R3b is disposed between the first zone R1b and the second zone R2b. Thus, the slide groove 21 has the zones R1b, R2b, R3b.

The slide groove 21 is provided with the first flat portion 29, the second flat portion 30 and the slant portion 31 so that the height T2 from the bottom chassis 11 of the second flat portion 30 contacted with the rotating member 32 in the second zone R2b is made higher than the height T1 from the bottom chassis 11 of the first flat portion 29 contacted with the rotating member 32 in the first zone R1b. In other words, the height T1 of the slide groove 21 contacted with the rotating member 32 in the first zone R1b when the movable arm 15 is positioned close to the first position and the height T2 of the slide groove 21 contacted with the rotating member 32 in the second zone R2b when the movable arm 15 is positioned close to the second position are different. The first zone R1b corresponds to the first portion described in this specification and the second zone R2b corresponds to the second portion described in this specification.

A second pushing unit 22 is mounted on the side chassis 12 of the chassis 10 in the main body 2. The second pushing unit 22 has the rotating member 32 as a pushed member and the coil spring 33 as a pushing member, as shown in FIG. 4-6. The rotating member 32 is formed plate-like and supported rotatably around one end portion thereof by the side chassis 12. The other end portion of the rotating member 32 penetrates into the slide groove 21 and abuts on the slide groove 21.

One end of the coil spring 33 is mounted on the side chassis 12 and the other end of the coil spring 33 is mounted on the rotating member 32. The coil spring 33 makes the other end portion of the rotating member 32 push toward the slide groove 21, i.e. the movable arm 15. Thus, the second pushing unit 22 pushes the movable arm 15 over the area between the first position and the second position. The coil spring 33 corresponds to the second pushing member described in this specification.

According to the above structured slide groove 21 and the second pushing unit 22, the other end of the rotating member 32 abuts on the first flat portion 29 of the slide groove 21 when the movable arm 15, i.e. the operation and display unit 3, is positioned close to the first position. The rotating member 32 is pushed toward the slide groove 21 by the pulling force of the coil spring 33, so that the second pushing unit 22 pushes the slide groove 21, i.e. the movable arm 15, with the first pushing force F1b (shown in FIGS. 4, 7). Thus, in the first zone R1b, the movable arm 15, i.e. the operation and display unit 3, is positioned close to the first position and the second pushing unit 22 pushes the movable arm 15 with the first pushing force F1b.

When the movable arm 15, i.e. the operation and display unit 3, is positioned close to the second position, the other end portion of the rotating member 32 abuts on the slide groove 21 in the second zone R2b. The other end portion of rotating member 32 abuts on the second flat portion 30 so that the coil spring 33 is extended. Thereby, the second pushing unit 22 pushes the slide groove 21, i.e. the movable arm 15, with the second pushing force F2b (shown in FIGS. 6, 9). Thus, in the second zone R2b, the movable arm 15, i.e. the operation and display unit 3, is positioned close to the second position and the second pushing unit 22 pushes the movable arm 15 with the second pushing force F2b.

The coil spring 33 is extended at the first position more than at the second position. Therefore, the first pushing force F1b is smaller than the second pushing force F2b.

According as the movable arm 15, i.e. the operation and display unit 3, moves from the first position toward the second position, the other end portion of the rotating member 32 abuts in order on from the first flat portion 29 to the slant portion 31 and the coil spring 33 is extended gradually. (The other end portion of the rotating member 32 is positioned in the transition zone R3b.) The pushing force of the second pushing unit 22 is changed gradually from the first pushing force F1b to the second pushing force F2b.

According as the movable arm 15, i.e. the operation and display unit 3, moves from the second position toward the first position, the other end portion of the rotating member 32 abuts in order on from the second flat portion 30 to the slant portion 31 and the coil spring 33 is returned gradually. (The other end portion of the rotating member 32 positioned in the transition zone R3b contacts with the slant portion 31.) The pushing force of the second pushing unit 22 is changed gradually from the second pushing force F2b to the first pushing force F1b.

Thus, the pushing force of the second pushing unit 22 is changed between the first position and the second position by the slide groove 21. The slide groove 21 makes the first pushing force F1b of the second pushing unit 22 when the movable arm 15, i.e. the operation and display unit 3, is positioned close to the first position smaller than the second pushing force F2b of the second pushing unit 22 when the movable arm 15, i.e. the operation and display unit 3, is positioned close to the second position.

According as the movable arm 15, i.e. the operation and display unit 3, moves from the first position toward the second position, the transition zone R3b changes the pushing force of the second pushing unit 22 gradually from the first pushing force F1b to the second pushing force F2b. According as the movable arm 15, i.e. the operation and display unit 3, moves from the second position toward the first position, the transition zone R3b changes the pushing force of the second pushing unit 22 gradually from the second pushing force F2b to the first pushing force F1b. The second pushing unit 22 corresponds to the pushing device described in this specification.

When the MD, the CD or the DVD-ROM is inserted into the main body 2 of the aforesaid multi-function electronic apparatus 1, the operation and display unit 3 is positioned at the third position shown in FIG. 2 or at the first position shown in FIG. 3. When the CD or the DVD-ROM is inserted into the main body 2 and map information or image of TV broadcast wave is displayed on the display panel 14, the operation and display unit 3 is positioned at the third position shown in FIG. 2. When the MD, the CD or the DVD-ROM is played or map information or image of TV broadcast wave is displayed on the display panel 14, the operation and display unit 3 is positioned at the second position shown in FIG. 1 or at the third position shown in FIG. 2.

In the multi-function electronic apparatus 1, the operation and display unit 3 can be moved between the second position and the third position by pushing the aforesaid push button 18 and can be positioned at any position between the second position and the third position. Thus, the operation and display unit 3 in the multi-function electronic apparatus 1 can be changed in angle freely between the second position and the third position.

The operation and display unit 3 positioned at any position between the second position and the third position in the multi-function electronic apparatus 1 can be moved to the first position by pushing the push button 18. When the MD is inserted or the push button 18 is pushed at the first position, the operation and display unit 3 in the multi-function electronic apparatus 1 can be moved toward the second position.

At the first position, the roller 26 is positioned at the bottom end portion 19a of the guide groove 19 in the first zone R1a as shown in FIG. 4, and the operation and display unit 3 is pushed with the first pushing force F1a by the first pushing unit 20 as shown in FIG. 11. And, the other end portion of the rotating member 32 is positioned on the first flat portion 29 of the slide groove 21 as shown in FIG. 4, and the movable arm 15 is pushed with the first pushing force F1b by the second pushing unit 22 as shown in FIG. 7.

When the motor 16 is driven to move the operation and display unit 3 from the first position toward the second position, the movable arm 15 is firstly moved in a direction of lengthwise thereof. One end portion 15a of the movable arm 15 is penetrating in the front surface 10a of the main body 2. According to the motion, the bottom end portion 3b of the operation and display unit 3 moves toward the front surface 10a and simultaneously the top end portion 3a of the operation and display unit 3 moves upward along the front surface 10a.

The first pushing unit 20 pushes the operation and display unit 3 with the first pushing force F1a smaller than the second pushing force F2a and the second pushing unit 22 pushes the movable arm 15 with the first pushing force F1b smaller than the second pushing force F2b until the movable arm 15 moves the predetermined distance A. Thus, load on the motor 16 is reduced. When the movable arm 15 moves the predetermined distance A, the other end portion of the rotating member 32 goes on the slant portion 31 of the slide groove 21. In other words, the other end portion of the rotating member 32 is positioned in the transition zone R3b.

When the movable arm 15, i.e. the operation and display unit 3, moves furthermore, the other end portion of the rotating member 32 is pushed upward by the slant portion 31, as shown in FIG. 8. Thereby, the coil spring 33 is extended so that the pushing force of the second pushing unit 22 for pushing the movable arm 15 is gradually increased.

When the movable arm 15, i.e. the operation and display unit 3, moves from the first position to the third position, the chamfer 28 of the roller 26 goes on the slant portion 24 of the projection 23 in the guide groove 19 at near side of the third position. Thus, the roller 26 is positioned in the transition zone R3a.

When the movable arm 15, i.e. the operation and display unit 3, moves more, the chamfer 28 abuts on the slant portion 24 and the roller 26 is pushed toward the operation and display unit 3. Thereby, the coil spring 27 is compressed and the pushing force of the first pushing unit 20 for pushing the operation and display unit 3 is gradually increased.

When the movable arm 15, i.e. the operation and display unit 3, is positioned at the third position, the chamfer 28 of the roller 26 abuts on the flat portion 25 of the projection 23 and the roller 26 is positioned in the second zone R2a. The coil spring 27 is compressed and the first pushing unit 20 pushes the roller 26, i.e. the operation and display unit 3, with the second pushing force F2a larger than the first pushing force F1a.

When the movable arm 15, i.e. the operation and display unit 3, is positioned at the third position, the other end portion of the rotating member 32 abuts on the second flat portion 30 of the slide groove 21 and the rotating member 26 is positioned in the second zone R2b. Thereby, the coil spring 33 is more extended and the second pushing unit 22 pushes the rotating member 32, i.e. the movable arm 15, with the second pushing force F2b larger than the first pushing force F1b.

Figure 9:
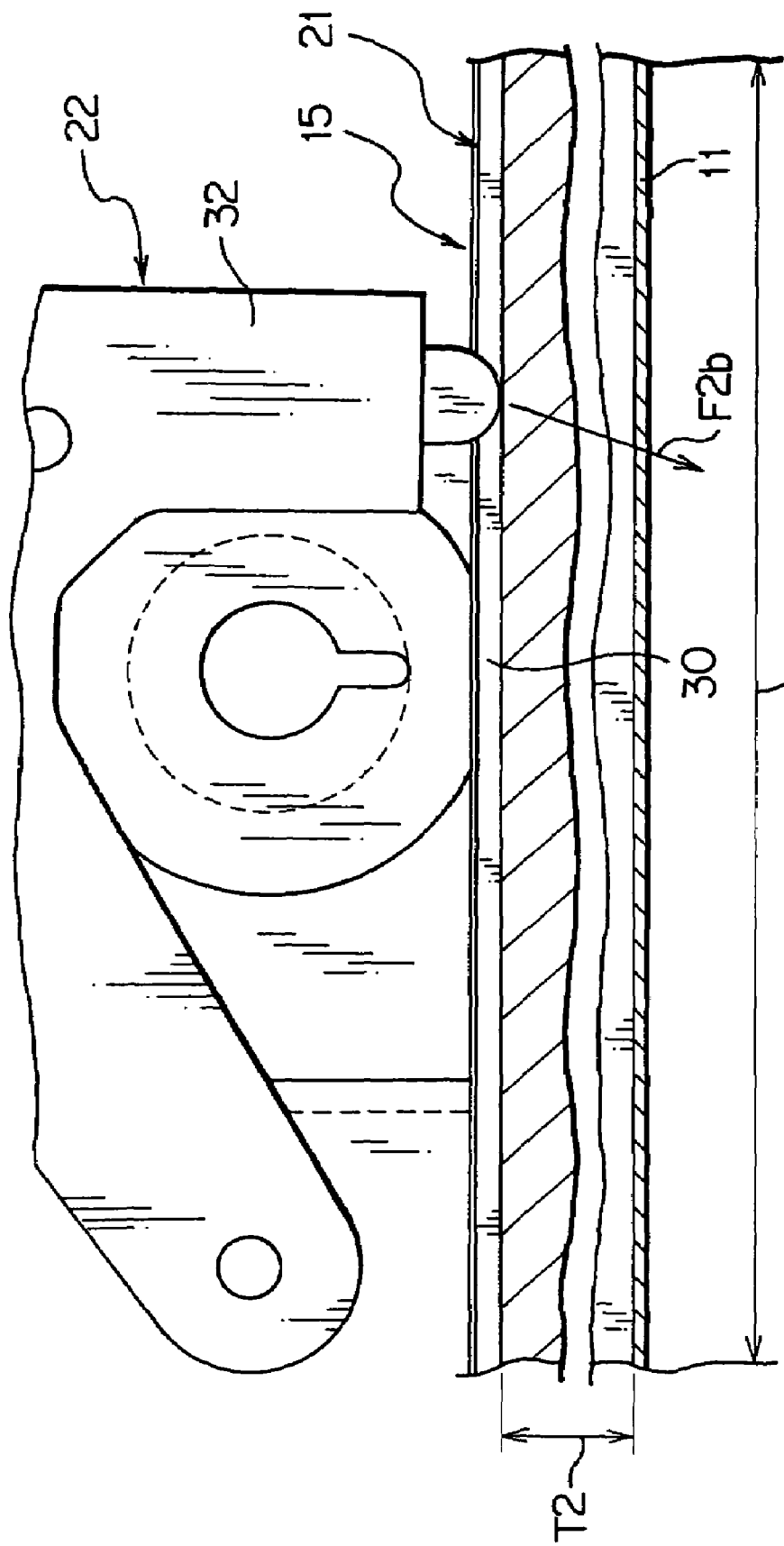
FIG. 9 is a partially sectional expanded view of the IX area of the multi-function electronic apparatus in FIG. 6.

Between the third position and the second position, the roller 26 moves on the flat portion 25, i.e. in the second zone R2a as shown in FIG. 13, and the other end of the rotating member 32 moves on the second flat portion 30, i.e. in the second zone R2b as shown in FIG. 9. The first pushing unit 20 pushes the operation and display unit 3 with the second pushing force F2a larger than the first pushing force F1a and the second pushing unit 22 pushes the movable arm 15 with the second pushing force F2b larger than the first pushing force F1b. The first and second pushing units 20, 22 prevent the operation and display unit 3 and movable arm 15 from rattling against the main body 2.

Thus, when the operation and display unit 3 and the movable arm 15 are positioned close to the second position, the operation and display unit 3 and the movable arm 15 are pushed by the first and second pushing units 20, 22 with the second pushing forces F2a, F2b larger than the first pushing forces F1a, F1b. The operation and display unit 3 and the movable arm 15 are positioned in the second position.

While the operation and display unit 3 moves through the third position from the second position toward the first position, the operation and display unit 3 and the movable arm 15 are pushed with the second pushing forces F2a, F2b by the first and second pushing unit 20, 22 between the second position and the third position. Thereafter, when the chamfer 28 of the roller 26 abuts on the slant portion 24 and the other end portion of the rotating member 32 abuts on the slant portion 31, the pushing forces of the first and second pushing units 20, 22 are gradually decreased from the second pushing forces F2a, F2b to the first pushing forces F1a, F1b.

Thereafter, when the operation and display unit 3 and the movable arm 15 are positioned close to the first position, the roller 26 is positioned in the first zone R1a, and the other end portion of the rotating member 32 abuts on the first flat portion 29 and is positioned in the first zone R1b. Thereby, the coil spring 27 is extended and the coil spring 33 is compressed so that the operation and display unit 3 and the movable arm 15 are pushed by the first and second pushing units 20, 22 with the first pushing forces F1a, F1b smaller than the second pushing forces F2a, F2b. Thus, the operation and display unit 3 and the movable arm 15 are positioned at the first position.

The pushing forces of the first and second pushing units 20, 22 pushing the operation and display unit 3 and the movable arm 15 over the area between the first position and the second position are changed between the first position and second position by the guide groove 19 and the slide groove 21.

According to this embodiment, the guide groove 19 and the slide groove 21 change the pushing forces of the first and second pushing units 20, 22 between the first position and the second position. Thereby, the pushing forces of the first and second pushing units 20, 22 can be reduced at a position in which a load on the motor 16 is usually larger. Therefore, the maximum load on the motor 16 can be reduced so that the motor can be prevented from becoming larger and increasing the cost. And cost of the multi-function electronic apparatus 1 can be reduced.

Because the load on the motor 16 is generally larger when the operation and display unit 3 and the movable arm 15 are positioned close to the first position, the guide groove 19 and the slide groove 21 reduce the pushing forces F1a, F1b of the first and second pushing units 20, 22 smaller than the second pushing forces F2a, F2b at the second position. Thereby, the pushing forces of the first and second pushing units 20, 22 at the first position in which the load on the motor 16 is generally high are reduced so that the maximum load on the motor 16 can be reduced. Therefore, the motor can be prevented from becoming larger and increasing the cost, and cost of the multi-function electronic apparatus 1 can be reduced.

Because the second pushing forces F2a, F2b are larger than the first pushing forces F1a, F1b, the operation and display unit 3 and the movable arm 15 positioned close to the second position are prevented from rattling against the main body 2.

The guide groove 19 and the slide groove 21 have the first zones R1a, R1b for setting the pushing forces of the first and the second pushing units 20, 22 to the first pushing forces F1a, F1b, the second zones R2a, R2b for setting the pushing forces to the second pushing forces F2a, F2b and the transition zones R3a, R3b between the first zones R1a, R1b and the second zones R2a, R2b. Thereby, the guide groove 19 and the slide groove 21 can reduce the pushing forces of the first and the second pushing units 20, 22 to the first pushing forces F1a, F1b when the operation and display unit 3 and the movable arm 15 are positioned close to the first position. The guide groove 19 and the slide groove 21 can change securely the pushing forces of the first and the second pushing units 20, 22 between the first pushing forces F1a, F1b and the second pushing forces F2a, F2b.

The guide groove 19 is provided at the main body 2 and the first pushing unit 20 is mounted on the operation and display unit 3. The slide groove 21 is provided at the movable arm 15 and the second pushing unit 22 is mounted on the main body 2. The first and second pushing units 20, 22 have the roller 26 and the rotating member 32 contacting with the guide groove 19 and the slide groove 21, and coil springs 27, 33 pushing the roller 26 and the rotating member 32 toward the guide groove 19 and the slide groove 21. Thereby, the first and second pushing units 20, 22 can push the operation and display unit 3 and the movable arm 15 by reaction forces generated by pushing the roller 26 and the rotating member 32 toward the main body 2 and the movable arm 15 with the coil springs 27, 33.

The first pushing unit 20 pushes the operation and display unit 3 as the front panel. Thereby, the operation and display unit 3 is prevented from rattling. The second pushing unit 22 pushes the movable arm 15 moving together with the operation and display unit 3. Thereby, the movable arm is prevented from rattling.

The first pushing unit 20 has the roller 26 and the coil spring 27 for pushing the roller 26. The roller 26 penetrates into the guide groove 19. Thus, by inserting the roller 26 into the guide groove 26 and pushing the roller 26 toward the guide groove 19 with the coil spring 27, the operation and display unit 3 can be pushed.

The depth D1 of the first zone R1a in which the roller 26 penetrates at the first position and the depth D2 of the second zone R2a in which the roller 26 penetrates at the second position are different. Thereby, the pushing forces of the first pushing unit 20 at the first position and the second position can be differed securely.

The second pushing unit 22 has the rotating member 32 and the coil spring 33 for pushing the rotating member 32 toward the slide groove 21. Therefore, by contacting the rotating member 32 with the slide groove 21 and pushing the rotating member 32 toward the slide groove 21 with the coil spring 33, the movable arm 15 can be pushed.

The height T1 of the first zone R1b in which the rotating member 32 contacts with the slide groove 21 at the first position and the height T2 of the second zone R2b in which the rotating member 32 contacts with the slide groove 21 at the second position are different. Thereby, the pushing forces of the second pushing unit 22 at the first position and the second position can be differed securely.

Figures 17A, 17B:
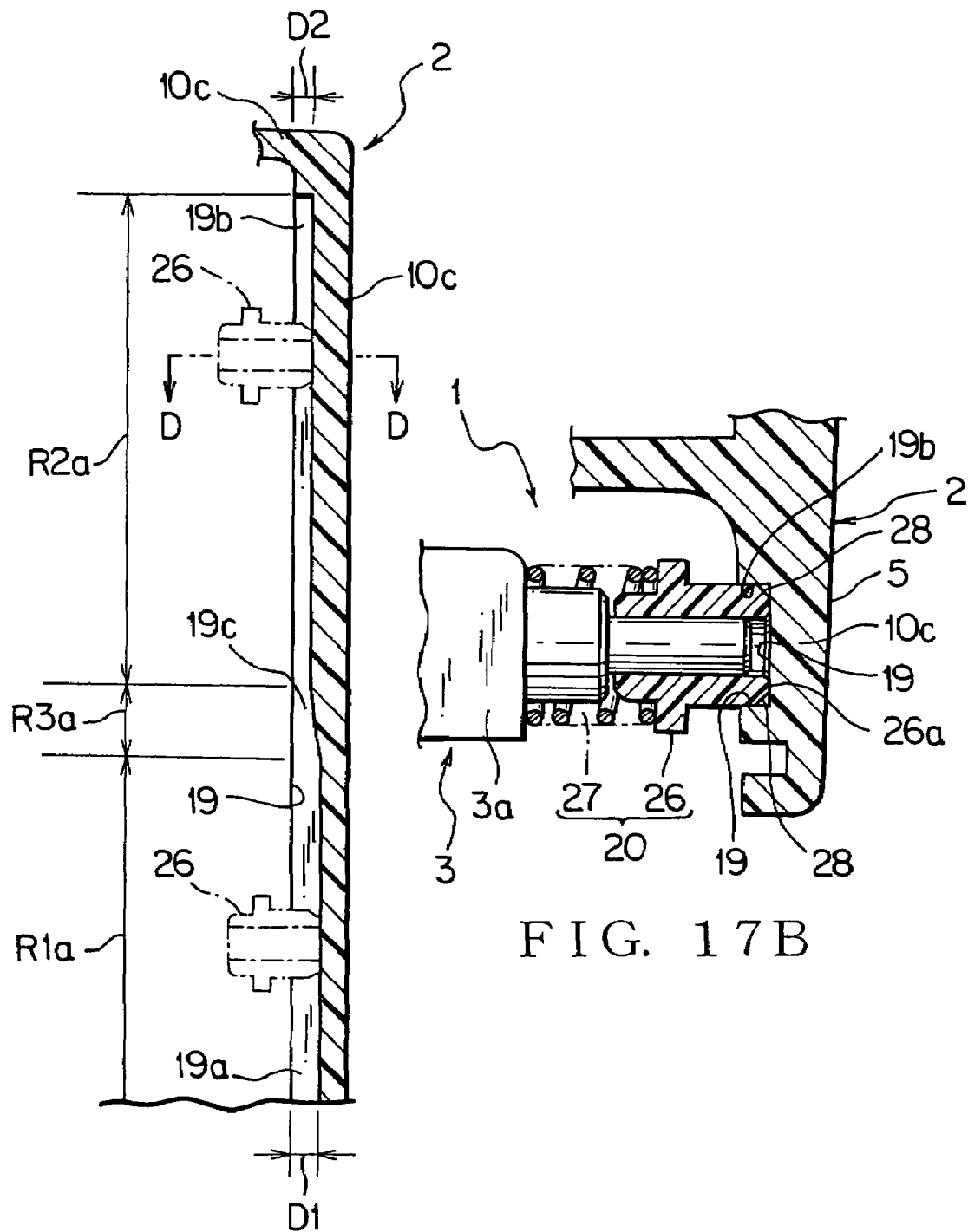
FIG. 17A is a sectional view of another modified embodiment of the movable arm shown in FIG. 10B.
FIG. 17B is a sectional view taken along the D-D line in FIG. 17A.

According to the aforesaid embodiment, the depth D1 of the first zone R1a and the depth D2 of the second zone R2a of the guide groove 19 are differed by disposing the projection 23 projecting from the inner surface of the guide groove 19. In this invention, by changing whole depth over the bottom surface of the guide groove 19 as shown in FIGS. 17A, 17B, the depth D1 of the first zone R1a and the depth D2 of the second zone. R2a of the guide groove 19 may be differed.

Figure 14:
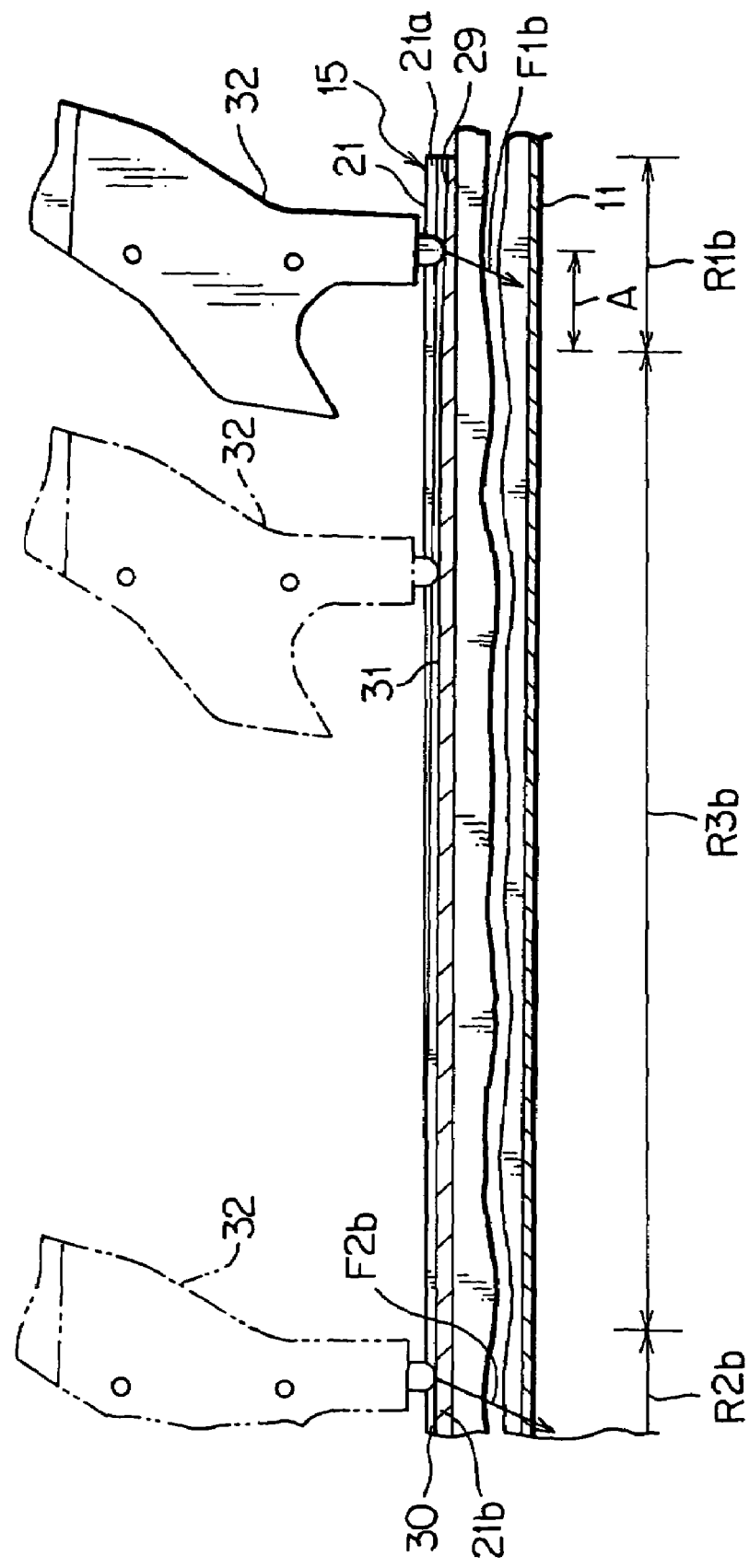
FIG. 14 is a sectional view of one modified embodiment of a movable arm shown in FIG. 4.

According this embodiment, the slide groove 21 has the first flat portion 29, the second flat portion 30 and the slant portion 31. The second pushing unit 22 pushes the movable arm 15 with the first pushing force F1b at the first flay portion and with the second pushing force F2b at the second flat portion. In this invention, the slide groove 21 may be formed slant over all so as to make the height against the bottom chassis 11 increase gradually from the rear end portion 21a to the front end portion 21b as shown in FIG. 14. The pushing force of the second pushing unit 22 to push the movable arm 15 is gradually increased according as the second pushing unit 22 moves from the first position shown with a continuous line through the third position shown with along dashed short dashed line to the second position shown with a long dashed double-short dashed line shown in FIG. 14.

According the aforesaid embodiment, the projection 23 of the guide groove 19 has the flat portion 25 and the slant portion 24. The pushing unit 20 pushes the operation and display unit 3 with the first pushing force F1a in the first zone R1a and the second pushing force F2a in the second zone R2a.

Figure 18:
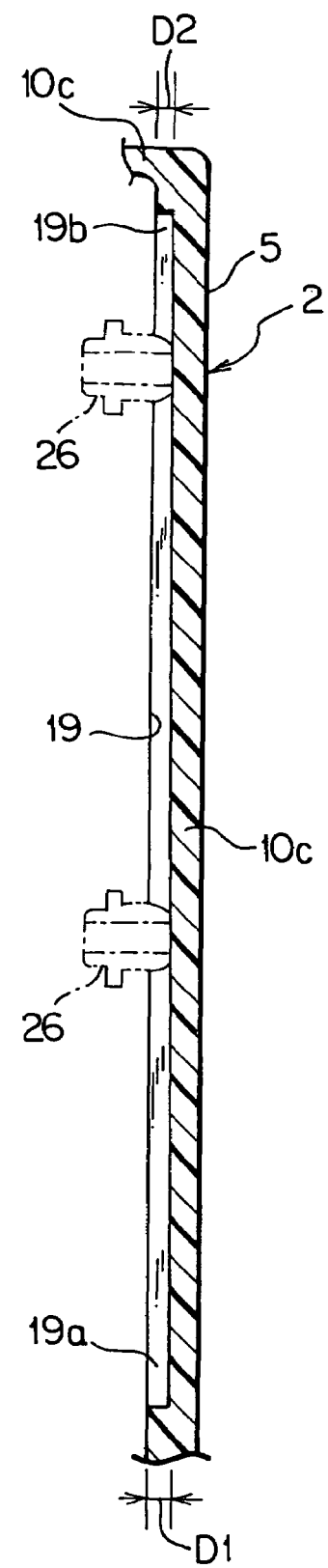
FIG. 18 is a sectional view of further modified embodiment of the movable arm shown in FIG. 10B.

In this invention, the guide groove 19 may be formed slant over all the bottom surface so as to make the depth decrease gradually from the bottom end portion 19a to the top end portion 19b as shown in FIG. 18. The pushing force of the first pushing unit 20 to push the operation and display unit 3 is gradually increased according as the first pushing unit 20 moves from the first position through the third position to the second position.

According to the above structure, the guide groove 19 and the slide groove 21 move the roller 26 and the other end portion of the rotating member 32. The guide groove 19 and the slide groove 21 change the pushing forces of the first and the second pushing units 20, 22 gradually from the first pushing forces F1a, F1b to the second pushing forces F2a, F2b or from the second pushing forces F2a, F2b to the first pushing forces F1a, F1b.

Thereby, the guide groove 19 and the slide groove 21 can reduce securely the pushing forces of the first and second pushing units 20, 22 to the first pushing forces F1a, F1b when the operation and display unit 3 and the movable arm 15 are positioned close to the first position. Thus, the guide groove 19 and the slide groove 21 can change securely the pushing forces of the first and the second pushing units 20, 22 between the first pushing forces F1a, F1b and the second pushing forces F2a, F2b.

Figure 16:
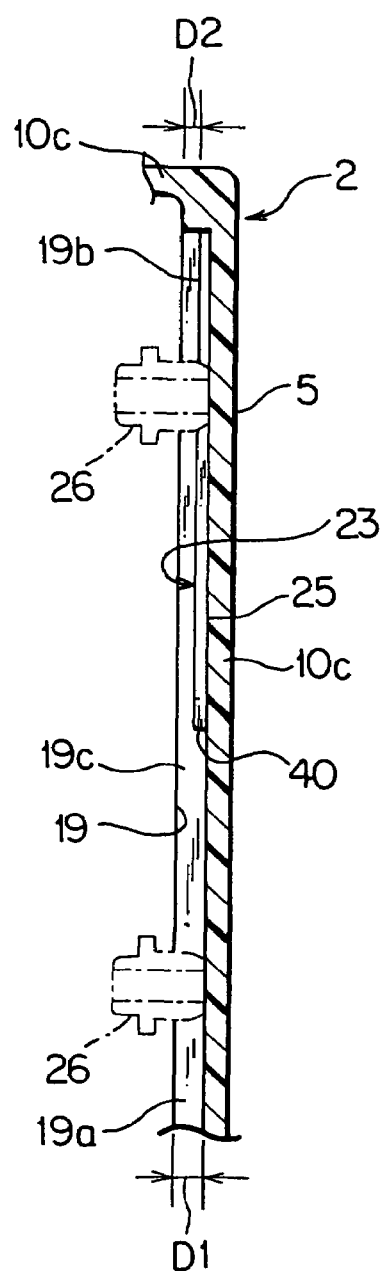
FIG. 16 is a sectional view of one modified embodiment of a guide groove shown in FIG. 10B.

In this invention, a step 40 instead of the slant portion 24 may be disposed at a bottom end of the flat portion 25 of the projection 23 as shown in FIG. 16. The first pushing unit 20 pushes the operation and display unit 3 with the first pushing force F1a when the first pushing unit 20 is positioned close to the first position and with the second pushing force F2a when the first pushing unit 20 is positioned close to the second position.

Figure 15:
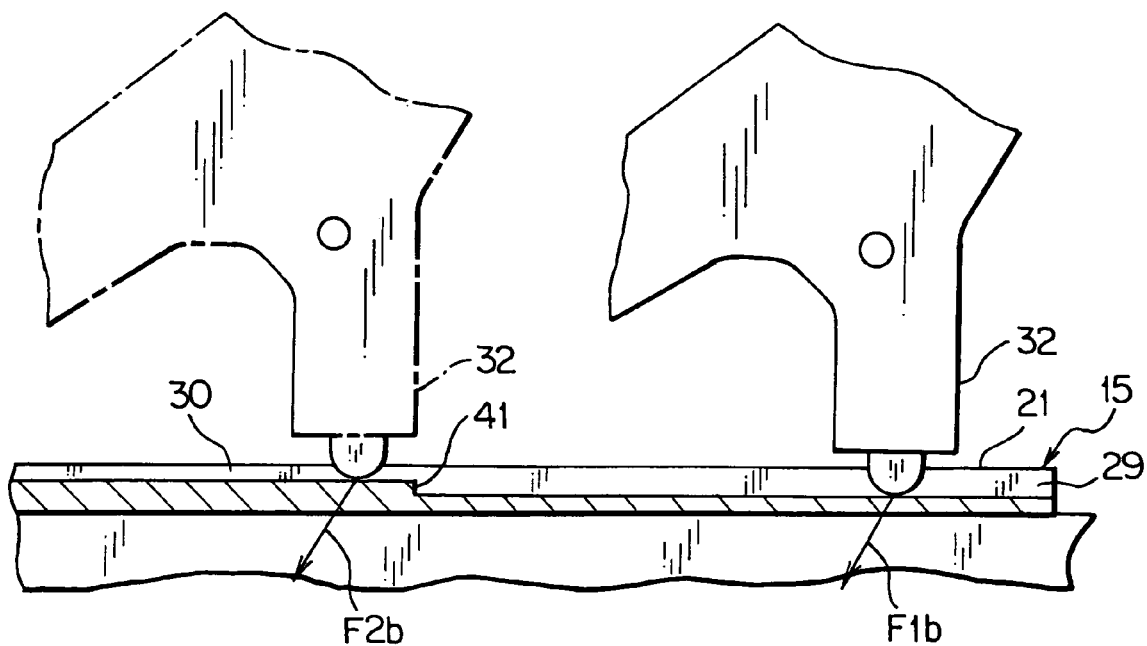
FIG. 15 is a sectional view of another modified embodiment of a movable arm shown in FIG. 4.

In this invention, a step 41 instead of the slant portion 31 may be disposed between the first flat portion 29 and the second flat portion 30 of the slide groove 21 as shown in FIG. 15. The second pushing unit 22 pushes the movable arm 15 with the first pushing force F1b when the second pushing unit 22 is positioned close to the first position and with the second pushing force F2b when the second pushing unit 22 is positioned close to the second position.

According to the above structure, the guide groove 19 and the slide groove 21 move the roller 26 and the rotating member 32 over the steps 40, 41. The guide groove 19 and the slide groove 21 change the pushing forces of the first and the second pushing units 20, 22 stepwise from the first pushing forces F1a, F1b to the second pushing forces F2a, F2b or from the second pushing forces F2a, F2b to the first pushing forces F1a, F1b.

Thereby, the guide groove 19 and the slide groove 21 can reduce securely the pushing forces of the first and second pushing units 20, 22 to the first pushing forces F1a, F1b when the operation and display unit 3 and the movable arm 15 are positioned close to the first position. Thus, the guide groove 19 and the slide groove 21 can change securely the pushing forces of the first and the second pushing units 20, 22 between the first pushing forces F1a, F1b and the second pushing forces F2a, F2b.

According to the above embodiment, the guide groove 19 is provided at the main body 2 and the first pushing unit 20 is mounted on the operation and display unit 3. The slide groove 21 is provided at the movable arm 15 and the second pushing unit 22 is mounted on the main body 2. In this invention, the guide groove 19 can be disposed at one of the main body 2 and the operation and display unit 3 and the first pushing unit 20 can be disposed at the other of them. The slide groove 21 can be disposed at one of the main body 3 and the movable arm 15 and the second pushing unit 22 can be disposed at the other of them.

Figure 19:
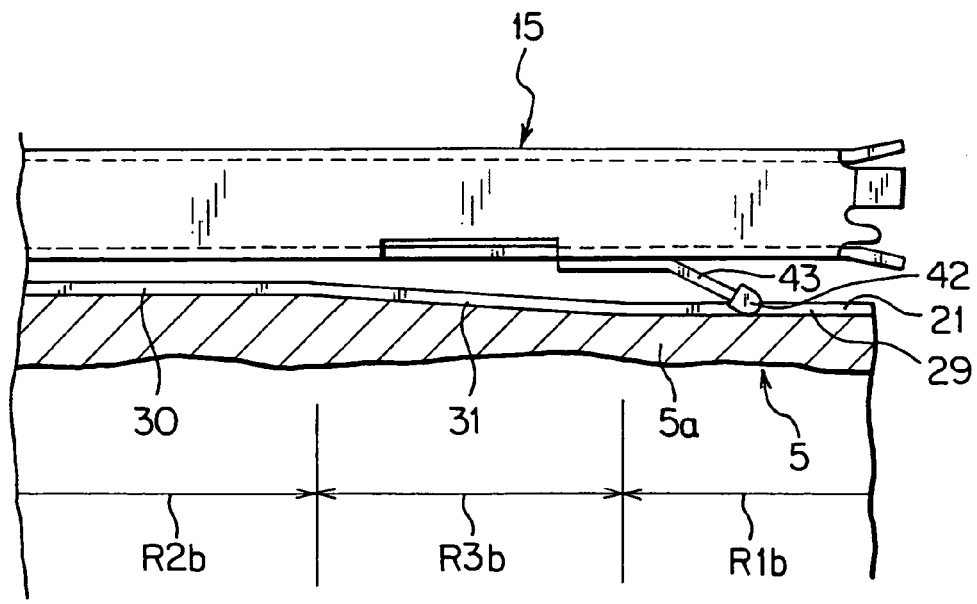
FIG. 19 is a sectional view of one modified embodiment of a second pushing (corresponding to energizing) unit and a slide groove shown in FIG. 4.

The slide groove 21 may be disposed at a bottom wall 5a of a case 5 of the main body 2 as shown in FIG. 19 and the second pushing unit 22 may be mounted on the movable arm 15. In FIG. 19, the second pushing unit 22 has a contact member 42 as the pushed member for contacting with the slide groove 21 and a flat spring 43 mounted on the movable arm 15 for pushing the contact member 42 toward the slide groove 21 (corresponding to the second pushing member). In FIG. 14-19, the same parts as the aforesaid embodiment are put the same marks and explanation is omitted.

According to the aforesaid embodiment, a plurality of push buttons 18 is provided at the display panel 14 of the operation and display unit 3. In this invention, touch-type switches (also called by a touch panel) may be applied on the display panel 14.

According to aforesaid embodiment, following multi-function electronic apparatuses can be supplied:

Appendix 1: A multi-function electronic apparatus 1 having the operation and display unit 3 and the movable arm 15 to be moved by a driving force of the motor 16 between the first position and the second position against the main body 2 is specified by comprising pushing units 20, 22 for pushing the operation and display unit 3 and the movable arm 15 over an area between the first position and the second position, and the guide groove 19 and the slide groove 21 for changing pushing forces of the pushing units 20, 22 between the first position and the second position.

Appendix 2: The multi-function electronic apparatus 1 according to Appendix 1, is specified by that a load on the motor 16 when the operation and display unit 3 and the movable arm 15 are positioned between the center of the first and second positions and the first position is larger than a load on the motor 16 when the operation and display unit 3 and the movable arm 15 are disposed between the center of the first and second positions and the second position, and the guide groove 19 and the slide groove 21 change the first pushing forces F1$a$, F1$b$ of the pushing units 20, 22 to push the operation and display unit 3 and the movable arm 15 positioned between the center of the first and second positions and the first position smaller than the second pushing forces F2$a$, F2$b$ of the pushing units 20, 22 to push the operation and display unit 3 and the movable arm 15 positioned between the center of the first and second positions and the second position.

Appendix 3: The multi-function electronic apparatus 1 according to Appendix 2, is specified by that the guide groove 19 and the slide groove 21 have the first zones R1$a$, R1$b$ in which the pushing units 20, 22 push the operation and display unit 3 and the movable arm 15 with the first pushing forces F1$a$, F1$b$ when the operation and display unit 3 and the movable arm 15 are positioned between the center of the first and second positions and the first position, the second zones R2$a$, R2$b$ in which the pushing units 20, 22 push the operation and display unit 3 and the movable arm 15 with the second pushing forces F2$a$, F2$b$ when the operation and display unit 3 and the movable arm 15 are positioned between the center of the first and second positions and the second position, and the transition zones R3$a$, R3$b$, being disposed between the first zones R1$a$, R1$b$ and the second zones R2$a$, R2$b$, in which the pushing forces of the pushing units 20, 22 are gradually changed from the first pushing forces F1$a$, F1$b$ to the second pushing forces F2$a$, F2$b$ while the operation and display unit 3 and the movable arm 15 move from the first position to the second position, and the pushing forces of the pushing units 20, 22 are gradually changed from the second pushing forces F2$a$, F2$b$ to the first pushing forces F1$a$, F1$b$ while the operation and display unit 3 and the movable arm 15 move from the second position to the first position.

Appendix 4: The multi-function electronic apparatus 1 according to Appendix 2, is specified by that the guide groove 19 and the slide groove 21 increase the pushing forces of the pushing units 20, 22 gradually from the first pushing forces F1$a$, F1$b$ to the second pushing forces F2$a$, F2$b$ while the operation and display unit 3 and the movable arm 15 move from the first position to the second position, and decrease the pushing forces of the pushing units 20, 22 gradually from the second pushing forces F2$a$, F2$b$ to the first pushing forces F1$a$, F1$b$ while the operation and display unit 3 and the movable arm 15 move from the second position to the first position.

Appendix 5: The multi-function electronic apparatus 1 according to Appendix 2, is specified by that the guide groove 19 and the slide groove 21 increase the pushing forces of the pushing units 20, 22 stepwise from the first pushing forces F1$a$, F1$b$ to the second pushing forces F2$a$, F2$b$ while the operation and display unit 3 and the movable arm 15 move from the first position to the second position, and decrease the pushing forces of the pushing units 20, 22 stepwise from the second pushing forces F2$a$, F2$b$ to the first pushing forces F1$a$, F1$b$ while the operation and display unit 3 and the movable arm 15 move from the second position to the first position.

Appendix 6: The multi-function electronic apparatus 1 according to any one of Appendixes 1-5, is specified by further comprising the roller 26 and the rotating member 32 to contact with the guide groove 19 and the slide groove 21 and coil springs 27, 33 to push the roller 26 and the rotating member 32 toward the guide groove 19 and the slide groove 21, and specified by that the guide groove 19 and the slide groove 21 are disposed in one of the operation and display unit 3 and the movable arm 15 and the main body 2, and the pushing units 20, 22 are disposed in the other of the operation and display unit 3 and the movable arm 15 and the main body 2.

Appendix 7: The multi-function electronic apparatus 1 according to any one of Appendixes 1-6, is specified by that the top end portion 3$a$ of the operation and display unit 3 is mounted slidably along the front surface 10$a$ of the main body 2 and the bottom end portion 3$b$ thereof is mounted so as to project and return freely against the front surface 10$a$ of the main body 2.

Appendix 8: The multi-function electronic apparatus 1 according to Appendix 7, is specified by that the bottom end portion 3$b$ of the operation and display unit 3 is supported by the movable arm 15 mounted slidably in a direction of intersecting the front surface 10$a$ of the main body 2 so as to project and return against the front surface 10$a$ of the main body 2.

Appendix 9: The multi-function electronic apparatus 1 according to Appendix 6 or 7, is specified by that the first pushing unit 20 pushing the operation and display unit 3 has the roller 26 supported rotatably at the top end portion 3$a$ of the operation and display unit 3 and the coil spring 27 for pushing the roller 26 outward of the operation and display unit 3, and the guide groove 19 is received the roller 26 to penetrate therein, and the depth D1 of the first zone R1$a$ which the roller 26 penetrates into when the operation and display unit 3 is positioned at the first position and the depth D2 of the second zone R2$a$ which the roller 26 penetrates into when the operation and display unit 3 is positioned at the second position are different.

Appendix 10: The multi-function electronic apparatus 1 according to Appendix 8, is specified by that the second pushing unit 22 pushing the movable arm 15 has the rotating member 32 being supported rotatably at the main body 2 and the coil spring 33 for pushing the rotating member 32 toward the movable arm 15, and the slide groove 21 is contacted with the rotating member 32, and the height T1 of the first zone R1$b$ in which the rotating member 32 contacts when the movable arm 15 is positioned at the first position and the height T2 of the second zone R2$b$ at which the rotating member 33 contacts when the movable arm 15 is positioned at the second position are different.

According to the multi-function electronic apparatus 1 described in Appendix 1, the guide groove 19 and the slide groove 21 change the pushing forces of the first and second pushing units 20, 22 between the first position and the second position. Thereby, the pushing forces of the first and second pushing units 20, 22 can be reduced at a position in which the load on the motor 16 is usually larger. Therefore, the maximum load on the motor 16 can be reduced so that the motor can be prevented from becoming larger and increasing the cost. And cost of the multi-function electronic apparatus 1 can be reduced.

According to the multi-function electronic apparatus 1 described in Appendix 2, the guide groove 19 and the slide groove 21 change the first pushing forces F1$a$, F1$b$ of the first and second pushing units 20, 22 smaller than the second pushing forces F2$a$, F2$b$ of them when the operation and display unit 3 and the movable arm 15 are positioned between the center of the first and second positions and the first position. Thereby, the pushing forces of the first and second pushing units 20, 22 at the first position in which the load on the motor 16 is generally high are reduced so that the maximum load on the motor 16 can be reduced. Therefore, the motor can be prevented from becoming larger and increasing the cost, and cost of the multi-function electronic apparatus 1 can be reduced.

Because the second pushing forces F2$a$, F2$b$ are larger than the first pushing forces F1$a$, F1$b$, the operation and display unit 3 and the movable arm 15 positioned between the center of the first and second positions and the second position are prevented from rattling against the main body 2.

According to the multi-function electronic apparatus 1 described in Appendix 3, the guide groove 19 and the slide groove 21 have the first zones R1$a$, R1$b$ for setting the pushing forces of the first and the second pushing units 20, 22 to the first pushing forces F1$a$, F1$b$, the second zones R2$a$, R2$b$ for setting the pushing forces to the second pushing forces F2$a$, F2$b$ and the transition zones R3$a$, R3$b$ between the first zones R1$a$, R1$b$ and the second zones R2$a$, R2$b$.

Thereby, the guide groove 19 and the slide groove 21 can reduce securely the pushing forces of the first and the second pushing units 20, 22 to the first pushing forces F1$a$, F1$b$ when the operation and display unit 3 and the movable arm 15 are positioned between the center of the first and second positions and the first position. The guide groove 19 and the slide groove 21 can change securely the pushing forces of the first and the second pushing units 20, 22 between the first pushing forces F1$a$, F1$b$ and the second pushing forces F2$a$, F2$b$.

According to the multi-function electronic apparatus 1 described in Appendix 4, the guide groove 19 and the slide groove 21 change the pushing forces of the first and the second pushing units 20, 22 gradually from the first pushing forces F1$a$, F1$b$ to the second pushing forces F2$a$, F2$b$ or from the second pushing forces F2$a$; F2$b$ to the first pushing forces F1$a$, F1$b$.

Thereby, the guide groove 19 and the slide groove 21 can reduce securely the pushing forces of the first and second pushing units 20, 22 to the first pushing forces F1$a$, F1$b$ when the operation and display unit 3 and the movable arm 15 are positioned between the center of the first and second positions and the first position. Thus, the guide groove 19 and the slide groove 21 can change securely the pushing forces of the first and the second pushing units 20, 22 between the first pushing forces F1$a$, F1$b$ and the second pushing forces F2$a$, F2$b$.

According to the multi-function electronic apparatus 1 described in Appendix 5, guide groove 19 and the slide groove 21 change the pushing forces of the first and the second pushing units 20, 22 stepwise from the first pushing forces F1$a$, F1$b$ to the second pushing forces F2$a$, F2$b$ or from the second pushing forces F2$a$, F2$b$ to the first pushing forces F1$a$, F1$b$.

Thereby, the guide groove 19 and the slide groove 21 can reduce securely the pushing forces of the first and second pushing units 20, 22 to the first pushing forces F1$a$, F1$b$ when the operation and display unit 3 and the movable arm 15 are positioned between the center of the first and second positions and the first position. Thus, the guide groove 19 and the slide groove 21 can change securely the pushing forces of the first and the second pushing units 20, 22 between the first pushing forces F1$a$, F1$b$ and the second pushing forces F2$a$, F2$b$.

According to the multi-function electronic apparatus 1 described in Appendix 6, the guide groove 19 and the slide groove 21 are disposed in one of the operation and display unit 3 and the movable arm 15 and the main body 2, and the pushing units 20, 22 are disposed in the other of them. The first and second pushing units 20, 22 have the roller 26 and the rotating member 32 contacting with the guide groove 19 and the slide groove 21, and coil springs 27, 33 pushing the roller 26 and the rotating member 32 toward the guide groove 19 and the slide groove 21.

Thereby, the first and second pushing units 20, 22 can push the operation and display unit 3 and the movable arm 15 by pushing the roller 26 and the rotating member 32 directly toward the operation and display unit 3 and the movable arm 15, or by reaction forces generated by pushing the roller 26 and the rotating member 32 toward the main body 2 and the movable arm 15 with the coil springs 27, 33.

According to the multi-function electronic apparatus 1 described in Appendix 7, the operation and display unit 3 as a movable portion is pushed. Thereby, the operation and display unit 3 is prevented from rattling.

According to the multi-function electronic apparatus 1 described in Appendix 8, the movable arm 15 as a movable portion moving together with the operation and display unit 3 is pushed. Thereby, the movable arm is prevented from rattling.

According to the multi-function electronic apparatus 1 described in Appendix 9, the first pushing unit 20 has the roller 26 and the coil spring 27 for pushing the roller 26. The roller 26 penetrates into the guide groove 19. Thus, by inserting the roller 26 into the guide groove 26 and pushing the roller 26 toward the guide groove 19 with the coil spring 27, the operation and display unit 3 can be pushed.

The depth D1 of the first zone R1$a$ in which the roller 26 penetrates at the first position and the depth D2 of the second zone R2$a$ in which the roller 26 penetrates at the second position are different. Thereby, the pushing forces of the first pushing unit 20 at the first position and the second position can be differed securely.

According to the multi-function electronic apparatus 1 described in Appendix 10, the second pushing unit 22 has the rotating member 32 and the coil spring 33 for pushing the rotating member 32 toward the slide groove 21. Therefore, by contacting the rotating member 32 with the slide groove 21 and pushing the rotating member 32 toward the slide groove 21 with the coil spring 33, the movable arm 15 can be pushed.

The height T1 of the first zone R1$b$ in which the rotating member 32 contacts with the slide groove 21 at the first position and the height T2 of the second zone R2$b$ in which the rotating member 32 contacts with the slide groove 21 at the second position are different. Thereby, the pushing forces of the second pushing unit 22 at the first position and the second position can be differed securely.

Although the present invention has been fully described by way of examples with reference to the accompanying drawings, it is to be noted that various change and modifications can be made with the scope of the present invention as defined by the following claims. Incidentally, the content of Japanese Patent Application No. 2003-59170 is hereby incorporated by reference.

What is claimed is:

1. An electronic apparatus having a movable portion to be moved by a driving force of a drive power source between a first position and a second position against a main body comprising:
   a pushing device for pushing said movable portion over an area between the first position and the second position; and
   a changing device for changing a pushing force of said pushing device to push said movable portion between the first position and the second position,
   wherein said movable portion is a front panel, one end portion thereof being mounted slidably along one surface of said main body and the other end portion thereof being mounted to project and return freely against the one surface of said main body,
   wherein the other end portion of said front panel is supported by a movable arm being mounted slidably in a direction of intersecting the one surface of said main body so as to project and return against the one surface of said main body,
   wherein said pushing device has a first pushing device, the first pushing device including a roller being supported rotatably at the one end of said front panel and a first pushing member for pushing said roller outward of said front panel, and
   wherein said roller penetrates the changing device, and a depth of a first portion of the changing device which said roller penetrates into when said front panel is positioned at the first position and a depth of a second portion of the changing device which said roller penetrates into when said front panel is positioned at the second position are different.

2. The electronic apparatus according to claim 1, wherein a load on said drive power source when said movable portion is positioned between the center of the first and second positions and the first position is larger than a load on said driving power source when said movable portion is positioned between the center of the first and second positions and the second position, and said changing device changes a first pushing force of said pushing device to push said movable portion positioned between the center of the first and second positions and the first position smaller than a second pushing force of said pushing device to push said movable portion positioned between the center of the first and second positions and the second position.

3. The electronic apparatus according to claim 2, wherein said changing device has a first zone in which said pushing device pushes said movable portion with the first pushing force when said movable portion is positioned between the center of the first and second positions and the first position, a second zone in which said pushing device pushes said movable portion with the second pushing force when said movable portion is positioned between the center of the first and second positions and the second position, and a transition zone, being disposed between the first zone and the second zone, in which said pushing force of said pushing device is gradually changed from the first pushing force to the second pushing force while said movable portion moves from the first position to the second position, and said pushing force of said pushing device is gradually changed from the second pushing force to the first pushing force while said movable portion moves from the second position to the first position.

4. The electronic apparatus according to claim 2, wherein said changing device increases said pushing force of said pushing device gradually from the first pushing force to the second pushing force while said movable portion moves from the first position to the second position, and decreases said pushing force of said pushing device gradually from the second pushing force to the first pushing force while said movable portion moves from the second position to the first position.

5. The electronic apparatus according to claim 2, wherein said changing device increases said pushing force of said pushing device stepwise from the first pushing force to the second pushing force while said movable portion moves from the first position to the second position, and decreases said pushing force of said pushing device stepwise from the second pushing force to the first pushing force while said movable portion moves from the second position to the first position.

6. The electronic apparatus according to any one of claims 1-5, further comprising a pushed member to contact with said changing device and a pushing member to push said pushed member toward said changing device, wherein said changing device is disposed in one of said movable portion and said main body and said pushing device is disposed in the other of said movable portion and said main body.

7. The electronic apparatus according to claim 1, wherein said pushing device has a second pushing device for pushing said movable arm, the second pushing device including a rotating member being supported rotatably at said main body and a second pushing member for pushing said rotating member toward said movable arm, wherein said changing device is contacted with said rotating member, and a height of a first portion at which said rotating member contacts when said movable arm is positioned at the first position and a height of a second portion at which said rotating member contacts when said movable arm is positioned at the second position are different.

* * * * *